(12) United States Patent
Machida et al.

(10) Patent No.: US 6,657,041 B1
(45) Date of Patent: Dec. 2, 2003

(54) PRODUCTION PROCESS OF POLYSUCCINIMIDE

(75) Inventors: Katsuhiko Machida, Chiba (JP); Susumu Fukawa, Kanagawa (JP); Shinji Ogawa, Kanagawa (JP); Toshio Katoh, Saitama (JP); Makoto Sukegawa, Kanagawa (JP); Yoshihiro Irizato, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/868,498

(22) PCT Filed: Dec. 27, 1999

(86) PCT No.: PCT/JP99/07331

§ 371 (c)(1), (2), (4) Date: Jun. 18, 2001

(87) PCT Pub. No.: WO00/39195

PCT Pub. Date: Jul. 6, 2000

(30) Foreign Application Priority Data

Dec. 25, 1998 (JP) .............................. 10-369975

(51) Int. Cl.$^7$ .............................. C08G 69/10
(52) U.S. Cl. ................ 528/328; 528/361; 528/363; 525/418; 525/419; 525/420
(58) Field of Search ................ 528/328, 363, 528/361; 525/418, 419, 420

(56) References Cited

U.S. PATENT DOCUMENTS

| | | | |
|---|---|---|---|
| 5,142,062 A | | 8/1992 | Knebel et al. |
| 5,552,517 A | * | 9/1996 | Martin ................ 525/418 |
| 5,688,903 A | | 11/1997 | Lepage |
| 5,830,985 A | * | 11/1998 | Kroner et al. ........... 528/328 |
| 5,856,427 A | * | 1/1999 | Chou ................ 525/420 |
| 5,888,959 A | * | 3/1999 | Kroner et al. ........... 510/361 |
| 6,346,569 B1 | * | 2/2002 | Irizato et al. ........... 524/538 |

FOREIGN PATENT DOCUMENTS

| | | |
|---|---|---|
| EP | 0578448 | 1/1994 |
| EP | 0644 257 A2 | 3/1995 |
| EP | 0856539 | 8/1998 |
| EP | 0866084 | 9/1998 |
| JP | 10-324746 | 12/1998 |
| JP | 11-181082 | 7/1999 |
| JP | 11-181085 | 7/1999 |
| JP | 11-240949 | 9/1999 |
| JP | 2000-044680 | 2/2000 |

* cited by examiner

Primary Examiner—P. Hampton-Hightower (57) ABSTRACT

A production process of high molecular weight polysuccinimide having a weight average molecular weight of 40,000 or higher is disclosed, which comprises the following steps: 1) mixing and heating aspartic acid and an acidic catalyst to produce a liquid, low molecular weight polymer mixture, 2) separating the acidic catalyst to appropriate extent from the liquid, low molecular weight polymer mixture, thereby directly changing a polymer-containing phase from a liquid phase into a solid phase to produce a solid, low molecular weight polymer mixture, and 3) conducting solid-state polymerization on the thus-obtained solid, low molecular weight polymer mixture. This process can be practiced in a simple apparatus, and is free of problems such as formation of a highly viscous phase, excessive formation of foam, and formation of a reaction mixture into coherent mass.

17 Claims, 1 Drawing Sheet

FIG. 1

PRODUCTION PROCESS OF POLYSUCCINIMIDE

TECHNICAL FIELD

This invention relates to a production process of polysuccinimide, and more specifically to a production process of polysuccinimide, which comprises conducting polymerization of aspartic acid by using an acidic catalyst.

BACKGROUND ART

Technical Background of Polysuccinimide and Its Production Process

Polysuccinimide is used as a suitable precursor or intermediate in the production of polyamino acid derivatives such as polyaspartic acid. Polysuccinimide and polyamino acid derivatives, such as polyaspartic acid, are known to have biodegradability, and are extremely useful as polymers compatible with the environment. Further, crosslinked polyaspartic acid salts which are derivatives of polysuccinimide are equipped with both biodegradability and water absorbency, and are extremely useful polymers.

As techniques for producing polysuccinimide by reacting aspartic acid in the presence of an acidic catalyst, there are, for example, the following conventional techniques (i) to (iii).

(i) U.S. Pat. No. 5,142,062

This patent discloses a technique for producing polysuccinimide having a weight average molecular weight of from 100,000 to 200,000 by the following steps: 1) reacting a mixture of aspartic acid and phosphoric acid or the like at 100 to 250° C. in a vacuum system lower than 1 bar to produce a solid reaction mixture containing polysuccinimide having a weight average molecular weight of from 10,000 to 100,000, and 2) grinding the solid reaction mixture obtained in the first step into particles, the sizes of which ranged from 0.001 to 2 mm, and then conducting polycondensation under conditions selected from the temperature and pressure ranges in the first stage.

In Example 1, a crude product composed of polysuccinimide and phosphoric acid was produced by mixing aspartic acid (50 g, 0.38 mol) and 85% phosphoric acid (25 g, 0.22 mol in terms of phosphoric acid) [phosphoric acid/aspartic acid molar ratio=0.58] and conducting polymerization at 200° C. for 4 hours in a vacuum system. It is disclosed that, when a portion of the crude product was investigated for its molecular weight after washing off phosphoric acid, the crude product was found to have a weight average molecular weight (Mw) of 86,000. In Example 2, polysuccinimide having a weight average molecular weight of 124,000 was obtained by further grinding the crude product of Example 1 into particles, the sizes of which ranged from 001 to 2.0 mm, and conducting polymerization again at 200° C. for 4 hours in a vacuum system of 1 mbar.

It is also disclosed from Example 1 and Example 2 that the reaction product changes, in its form, from a fluid into a solid as the reaction proceeds. This technique features that the inclusion of grinding makes it possible to produce polysuccinimide having a high weight average molecular weight. However, to conduct industrial production while suitably dealing with a reaction in which a reaction product undergoes solidification, a special reactor is generally required, thereby making it difficult to design equipment. Especially when the form of the reaction product continuously changes from a fluid into a solid as the reaction proceeds, it is difficult to design a continuous reactor which can meet such changes.

Incidentally, the molar ratio of phosphoric acid to aspartic acid remains constant from the initiation to the end of the reaction in this conventional technique.

(ii) U.S. Pat. No. 5,457,176 (corres. JP 7-216084 A)

This patent discloses a technique for producing an amino acid polymer by heating a mixture of an amino acid and an acidic catalyst. Specifically, it is clearly indicated in column 2, lines 15–16 that an object of this technique is to produce an amino acid polymer the maximum weight average molecular weight of which is 60,000 or lower.

Further, Example 3 discloses an example in which a reaction mixture in the form of wet tacky white powder, which had been obtained by mixing aspartic acid (800 g, 6.01 mol) and 85% orthophosphoric acid (200 g, 1.73 mol in terms of phosphoric acid), was heated in the form of a layer on a stainless steel pan. It is disclosed in Example 3 that, when heated at 240° C. for 1 hour, the reaction mixture in the form of the wet tacky white powder changed into a solid mass which was hard on an outer side but was tacky in a central part. Polysuccinimide the weight average molecular weight of which was 15,500 was obtained by grinding that solid mass with a pestle in a mortar and heating the resulting powder further at 240° C. for 6 hours.

However, to practice industrial production while suitably dealing with a reaction in which a reaction mixture changes from a tacky form into a solid mass, a special reactor is needed so that the designing of equipment is extremely difficult. In particular, a need arises for a reactor provided with a special mechanism which does not develop a fault or the like in the presence of phosphoric acid at elevated temperatures. It is difficult to design such a reactor.

Among the weight average molecular weights of the polysuccinimide samples disclosed in the Examples, the highest weight average molecular weight is 24,000. This is consistent with the object to produce an amino acid polymer the molecular weight of which is 60,000 or lower.

Incidentally, the molar ratio of phosphoric acid to aspartic acid also remains constant from the initiation to the end of the reaction in this conventional technique.

(iii) U.S. Pat. No. 5,688,903 (corres. JP 8-231710 A)

This patent discloses a process for the production of a polycondensation product of an amino acid or a polypeptide hydrolyzate of the polycondensation product by subjecting the amino acid to bulk polycondensation under heat in the presence of phosphoric acid, phosphorus pentoxide or polyphosphoric acid and optionally, then conducting hydrolysis. This technique features that a fine particulate raw material is prepared with 0.005 to 0.25 mol of the catalyst evenly dispersed therein per molecule of the amino acid and polycondensation is then conducted.

Its Examples disclose illustrative reactions in a vacuum system and illustrative reactions in an atmospheric pressure system. Each of those reactions was conducted after comminuting a raw material, which was composed of a uniform mixture of aspartic acid and phosphoric acid, into a fine particulate raw material in a comminuting machine.

Problems, such as formation of a foam phase during the polymerization and formation of a coherent mass after the polymerization, were overcome by conducting the reaction while using the fine particulate raw material in which the amount of phosphoric acid, phosphorus pentoxide or polyphosphoric acid is controlled in the above-described range. When the viscosity indexes of the polysuccinimide samples as determined in the form of DMF solutions are converted into weight average molecular weights, the weight average molecular weight is, however, about 19,000 in Example 4 and about 28,000 in Example 8. The polysuccinimide samples obtained in the Examples are limited to low molecular weight polysuccinimide samples the weight average molecular weights of which are lower than 30,000. This process is, therefore, not sufficient as a process for the production of high molecular weight polysuccinimide.

In Example 10 (comparative example) in which phosphoric acid was used beyond the above-described range, on the other hand, polysuccinimide the weight average molecular weight was about 76,000 was formed. It is, therefore, appreciated that Example 10 (comparative example) afforded polysuccinimide having a higher weight average molecular weight than the above-described Examples 4 and 9 although formation of a viscous phase and coagulation of the reaction product took place in Example 10. In this conventional technique, the molar ratio of phosphoric acid to aspartic acid also remains constant from the initiation to the end of the reaction.

As mentioned above, polymerization—in which as in the conventional techniques (i) and (ii), solidification of a reaction product takes place and grinding is required—renders the designing of equipment difficult when practice of continuous mass-production is desired. In particular, a need arises for a reactor provided with a special mechanism which does not develop a fault or the like in the presence of phosphoric acid at elevated temperatures. It is difficult to design such a reactor. The conventional technique (iii), on the other hand, can avoid the formation of a viscous phase and the formation of coherent mass of the reaction product owing to the use of a fine particulate reaction raw material in which the amount of phosphoric acid is controlled in the predetermined range. However, the weight average molecular weight of the thus-produced polysuccinimide is low.

As a conclusion, no conventional technique was able to manage to achieve, at the same time, the production polysuccinimide having a high weight average molecular weight and the prevention of formation of a viscous phase, formation of foam and the formation of coherent mass of the reaction product.

Further, there was no process that can produce polysuccinimide having a high weight average molecular weight when solid-state polymerization is conducted in an atmospheric pressure system.

DISCLOSURE OF THE INVENTION

An object of the present invention is to produce polysuccinimide having a high weight average molecular weight.

Another object of the present invention is to provide polysuccinimide by simpler equipment.

A further object of the present invention is to overcome the formation of an extremely viscous phase, the excessive formation of foam, the formation of coherent mass of a reaction production and like problems, all of which arose in the course of production by the conventional techniques, and to produce polysuccinimide suited for continuous mass-production and having a high weight average molecular weight.

A still further object of the present invention is to produce polysuccinimide having a high weight average molecular weight by solid-state polymerization in an atmospheric pressure system.

With a view to achieving the above-described objects, the present inventors have proceeded with an extensive investigation on production processes of high molecular weight polysuccinimide. As a result, it has been found that high molecular weight polysuccinimide having a weight average molecular weight of 40,000 or higher can be produced by a production process in which the following three steps are conducted continuously and/or batchwise:

1) mixing and heating aspartic acid and an acidic catalyst to produce a liquid, low molecular weight polymer mixture;

2) separating the acidic catalyst to appropriate extent from the liquid, low molecular weight polymer mixture, thereby directly changing a polymer-containing phase from a liquid phase into a solid phase to produce a solid, low molecular weight polymer mixture; and 3) conducting solid-state polymerization on the solid, low molecular weight polymer mixture.

Described specifically, the present invention provides a production process of high molecular weight polysuccinimide, which comprises the following steps 1) to 3):

1) polycondensing a mixture, which comprises aspartic acid and an acidic catalyst, a weight concentration $C1$ of the acidic catalyst based on a total weight of a weight of the aspartic acid and a weight $WA1$ of the acidic catalyst being indicated by the below-described numerical formula (1), at 80 to 350° C. to produce a liquid, low molecular weight polymer mixture comprising low molecular weight polysuccinimide, which has a weight average molecular weight $Mw1$ indicated by the below-described numerical formula (2), and the acidic catalyst:

$$20 \text{ [wt. \%]} \leq C1 \leq 99 \text{ [wt. \%]} \tag{1}$$

$$1.0 \times 10^4 \leq Mw1 \leq 2.0 \times 10^5 \tag{2}$$

2) from said liquid, low molecular weight polymer mixture produced in step 1, producing a solid, low molecular weight polymer mixture wherein the low molecular weight polymer has a weight average molecular weight $Mw2$ indicated by the below-described numerical formula (5), and a weight concentration $C2$ of said acidic catalyst based on a total weight of a weight of low molecular weight polysuccinimide and a weight $WA2$ of said acidic catalyst is indicated by the below-described numerical formula (3) and said weight $WA2$ of said acidic catalyst is indicated by the below-described numerical formula (4), and said solid, low molecular weight polymer mixture being free from melting under reaction conditions of the following step 3):

$$5 \text{ [wt. \%]} \leq C2 \leq 55 \text{ [wt. \%]} \tag{3}$$

$$WA2 \leq WA1 \tag{4}$$

$$1.0 \times 10^4 \leq Mw2 \leq 2.0 \times 10^5 \tag{5}$$

3) subjecting the solid, low molecular weight polymer mixture produced in step 2) to solid-state polymerization at 120 to 350° C. to produce a solid, high molecular weight polymer mixture comprising high molecular weight polysuccinimide, which has a weight average molecular weight $Mw3$ capable of satisfying the below-described numerical formulas (6), (7) and (8) at the same time, and the acidic catalyst:

$$4.0 \times 10^4 \leq Mw3 \leq 1.0 \times 10^6 \tag{6}$$

$$Mw1 \leq Mw3 \tag{7}$$

$$Mw2 \leq Mw3 \tag{8}$$

BEST MODES FOR CARRYING OUT THE INVENTION

[1] Aspartic Acid

The aspartic acid for use in the present invention can be any one of L-form, D-form and DL-form.

[2] Acidic Catalyst

No particular limitation is imposed on the acidic catalyst for use in the present invention. Nonetheless, phosphorus oxyacids are preferred, for example. Specific examples of phosphorus oxyacids can include orthophosphoric acid (molecular weight: 98.00), pyrophosphoric acid, polyphosphoric acid, and phosphorus pentoxide. In the present invention, it is preferred to use at least one phosphorus oxyacid selected from the group consisting of these phosphorus oxyacids.

The acidic catalyst to be used may be in a form diluted with a solvent (for example, a polar solvent such as water, an alcohol or a ketone). When phosphoric acid is used, for example, a mixture consisting of 85 wt. % of phosphoric acid and 15 wt. % of water can be used. In general, the acidic catalyst may be used preferably at a concentration of 10 wt. % or higher, more preferably at a concentration of 50 wt. % or higher, particularly preferably at a concentration of 70 wt. % or higher, most preferably at a concentration of 85 wt. or higher. When the concentration of the acidic catalyst is excessively low, however, the solvent must be eliminated generally in a greater amount in the course of the polymerization, so that extra energy will be used.

[3] Polysuccinimide

The polysuccinimide available in accordance with the process of the present invention may have either a linear structure or a branched structure.

[4] Inert Gas

In the present invention, it is preferred to use an inert gas in at least one of the steps. No particular limitation is imposed on the composition of the inert gas, but preferred is a gas which does not give adverse effect on the reaction. Specifically, nitrogen, carbon dioxide, argon or the like is preferred. As the inert gas, it is possible to use a single kind of gas or to use plural kinds of gases in combination.

The inert gas can also be used as a heat-conducting medium. Even when continuous mass-production is conducted, the inert gas, as a heating medium, can efficiently and evenly heat the reaction mixture, thereby making it possible to product polysuccinimide of reduced variations in quality (for example, weight average molecular weight)

It is generally preferred to reuse the inert gas after subjecting it to regeneration treatment. This regeneration treatment is applied generally to lower the concentration(s) of water and/or impurities (reaction byproduct, a portion of the solid, low molecular weight polymer mixture, etc.) in the inert gas.

As specific processing, it is generally preferred to lower the concentration(s) of water and/or impurities by conducting at least one processing selected from adsorption, absorption, cooling, heating, dust collection and the like. In adsorption, a zeolite, a hydrophilic cross-linked resin (for example, an ion exchange resin) or the like can be used as an adsorbent.

When an inert gas is employed, polysuccinimide is generally obtained with a lowered weight average molecular weight if the concentration of water in the inert gas is high. When the water concentration is 0% in contrast, no influence is given to the resulting polymer but in general, a care must be exercised to avoid incurrence of any excessive cost in connection with regeneration treatment of the inert gas.

As another standard for the water concentration, the dew point of the inert gas can also be used. In the present invention, the dew point of an inert gas is generally −20° C. or lower, preferably −30° C. or lower, more preferably −40° C. or lower, particularly preferably −50° C. or lower, most preferably −60° C. or lower.

A high impurity concentration may lead to occurrence of coloring, a modification or the like on the resulting polysuccinimide in some instances. When the impurity concentration is 0% in contrast, no influence is given to the resulting polymer but in general, a care must be exercised to avoid incurrence of any excessive cost in connection with regeneration treatment of the inert gas.

[5] Outline of the Steps in the Present Invention

Figure 1:
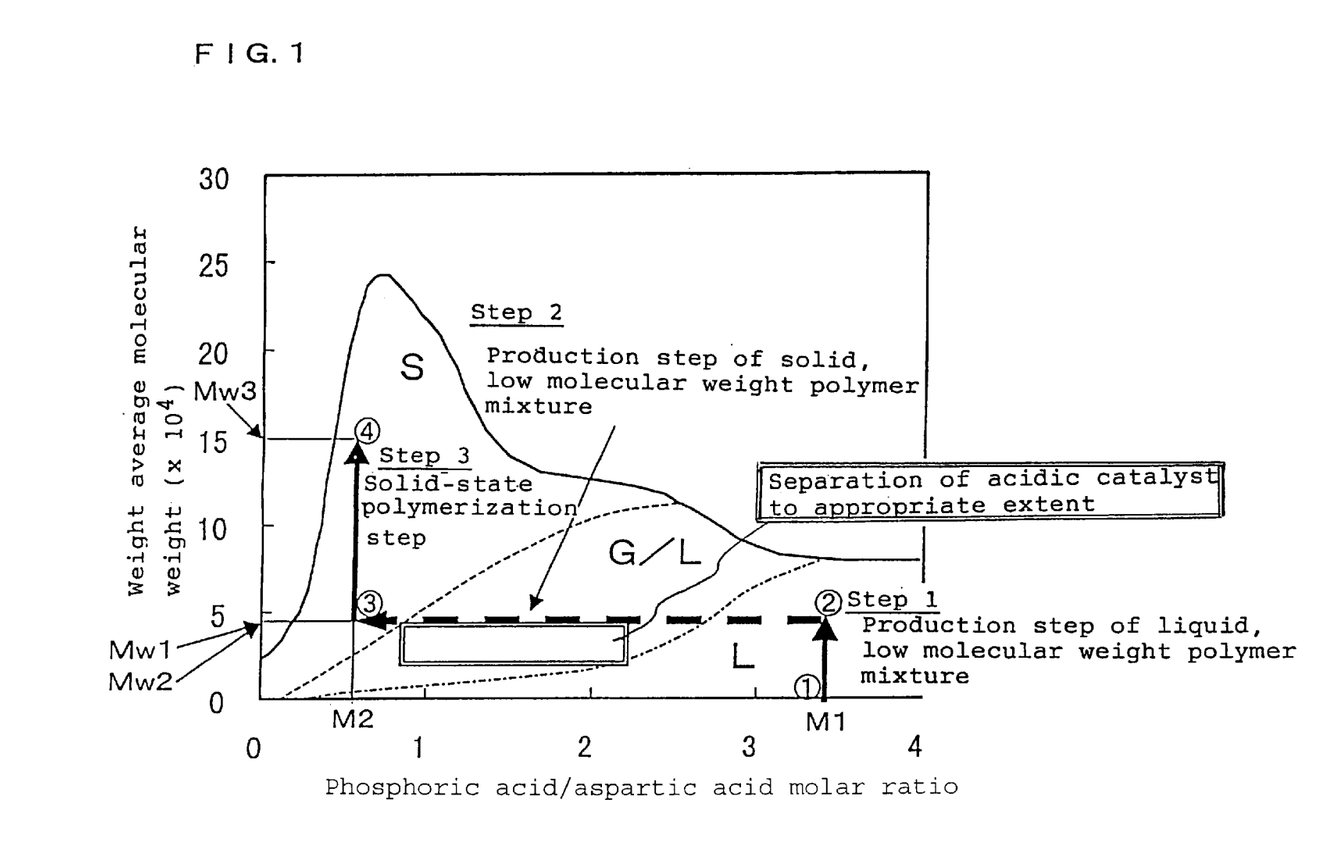
FIG. 1 illustrates the outline of the steps in the present invention and illustrative phases during reactions.

With reference to FIG. 1, a description will hereinafter be made of the outline of the present invention. It is, however, to be noted that FIG. 1 merely illustrates by way of example the outline of the steps in the present invention and does not necessarily limit the details of the present invention.

FIG. 1 illustrates, as an example, a case in which orthophosphoric acid (designated as "phosphoric acid" in FIG. 1; molecular weight: 98.00) was used as an acidic catalyst. In FIG. 1, the weight concentration of the acidic catalyst is shown in terms of its molar ratio to aspartic acid (molecular weight: 133.10). Even when aspartic acid is converted into polysuccinimide, use of the molecular weight of a unit structure of the polymer (molecular weight of the unit structure of polysuccinimide: 97.07) upon conversion into a molar ratio makes it possible to calculate the molar ratio of the acidic catalyst to aspartic acid and/or polysuccinimide.

When phosphoric acid is used as an acidic catalyst, phosphoric acid itself may undergo condensation in the course of the reaction so that the molecular weight of phosphoric acid may change. In view of this possibility, an investigation is conducted in terms of the molar number of phosphorus when phosphoric acid is used as an acidic catalyst.

FIG. 1 also shows, by way of example, phase changes as a function of the amount of phosphoric acid at the time of the reaction and the weight average molecular weight. In the diagram, the solid curve indicates the weight average molecular weight when the polymerization was conducted at 200° C. for 20 hours in a vacuum system.

In FIG. 1, a boundary between a region "L", in which the reaction mixture is in the form of a liquid of relatively low viscosity and permits easy polymerization, and another region "G/L", in which the reaction mixture is in the form of a liquid of relatively high viscosity and may undergo foaming or the like depending on the setting of reaction conditions, is indicated by an alternate long and short dash line. Further, a boundary between the region "G/L", in which the reaction mixture is in the form of a liquid of relatively high viscosity and may undergo foaming or the like depending on the setting of reaction conditions, and a further region "S", in which the reaction mixture takes a solid form, is indicated by a dashed line.

A description will now be made using FIG. 1. The production process according to the present invention primarily consists of three steps (①→②→③→④ in FIG. 1) as will be described next.

(1) In step 1 (production step of a liquid, low molecular weight polymer mixture: ①→②), a mixture (① in FIG. 1) which contains aspartic acid and the acidic catalyst, the molar ratio of said acidic catalyst to said aspartic acid being M1, is subjected to polycondensation at 80 to 350° C. to produce a liquid, low molecular weight polymer mixture (② in FIG. 1) which contains a low molecular weight polysuccinimide having a weight average molecular weight Mw1 and the acidic catalyst at the molar ratio of M1. In this step 1 (①→②), the acidic catalyst may also function as a catalyst preferably, and the liquid, low molecular weight polymer mixture is obtained. When the acidic catalyst is dealt with in terms of weight concentration, the weight concentration of the acid catalyst relatively increases when water formed as a result of the polycondensation of aspartic acid is separated from the reaction system. Since the investigation made in terms of molar ratio is shown in FIG. 1 as mentioned above, the molar ratio of the acidic catalyst remains constant.

(2) As step 2 (production step of solid, low molecular polymer mixture:②→③), a solid, low molecular polymer mixture (③ in FIG. 1)—which contains polysuccinimide having a weight average molecular weight Mw2 and the acidic catalyst at a molar ratio M2 and is not liquefied (molten) under reaction conditions of step 3—is produced by removing the acidic catalyst, which is also functioning as a solvent, to appropriate extent from the liquid, low molecular weight polymer mixture (② in FIG. 1) produced in step 1. As is appreciated from the diagram, there is no substantial change between the weight average molecular weight Mw1 of the polysuccinimide and the weight average molecular weight Mw2 of polysuccinimide before and after step 2 (② and ③).

(3) As step 3 (solid-state polymerization step :①→④), the solid, low molecular weight polymer mixture produced in step 2 is subjected to solid-state polymerization at 120 to 350° C. to produce a solid, high molecular weight polymer mixture (④ in FIG. 1) comprising high molecular weight polysuccinimide having a weight average molecular weight Mw3 and said acidic catalyst.

According to the production process of the present invention which comprises such steps, the problems which arose in the course of polymerization by the conventional techniques, such as the formation of an extremely viscous phase, the excessive formation of foam and the formation of coherent mass of the reaction product, have been overcome by the appropriate setting of the concentration of the acidic catalyst and the weight average molecular weight in the respective steps, and polysuccinimide having a high weight average molecular weight can be produced.

The respective steps 1 to 3 will hereinafter be described in detail.

[6] Step 1 (Production Step of a Liquid, Low Molecular Weight Polymer Mixture)

Step 1 (production step of a liquid, low molecular weight polymer mixture) can be practiced continuously and/or batchwise.

No particular limitation is imposed on step 1, insofar as a liquid, low molecular weight polymer mixture, which contains low molecular weight polysuccinimide having a weight average molecular weight Mw1 indicated by the below-described numerical formula (2) and the acidic catalyst, is produced by subjecting to polycondensation at 80 to 350° a mixture which contains aspartic acid and the acidic catalyst the weight concentration C1 of which based on a total weight of a weight of the aspartic acid and a weight WA1 of the acidic catalyst is indicated by the below-described numerical formula (1).

$$20\ [\text{wt. }\%] \leq C1 \leq 99\ [\text{wt. }\%] \tag{1}$$

$$1.0 \times 10^4 \leq Mw1 \leq 2.0 \times 10^5 \tag{2}$$

The term "liquid" as used herein in connection with the resulting low molecular weight polymer mixture has a meaning that embraces a solution form, a dispersion form, a syrup form, a paste form and the like.

1) Amount of the Acidic Catalyst

In step 1, the acidic catalyst functions to catalyze the polycondensation reaction of aspartic acid. Preferably, this acid catalyst can also function as a solvent for the reactant.

In the present invention, the liquid, low molecular weight polymer mixture is produced at an acidic catalyst concentration C1 in the range of the numerical formula (1). If the acidic catalyst is used at a concentration lower than the range of the numerical formula (1), the viscosity of the reaction mixture may increase as the molecular weight of polysuccinimide increases in the course of the polymerization. As a result, foaming may take place, thereby possibly making it difficult to continue the polymerization. IL the reaction is allowed to proceed further, the reaction mixture, still in its foamed state, may solidify in the form of a mass. In some instances, the reaction mixture may deposit on the reactor so that it may become extremely difficult to continue the polymerization. Conversely, use of the acidic catalyst in excess of the range of the numerical formula (1) requires more energy for the separation and reuse of the acidic catalyst and hence, is uneconomical in general.

In the present invention, the weight concentration C1 of the acidic catalyst based on the total weight of the weight of aspartic acid and the weight WA1 of the acidic catalyst may fall preferably within a range indicated by the below-described numerical formula (1-1), more preferably within a range indicated by the below-described numerical formula (1-2), especially preferably within a range indicated by the below-described numerical formula (1-3).

$$30\ [\text{wt. }\%] \leq C1 \leq 94\ [\text{wt. }\%] \tag{1-1}$$

$$37\ [\text{wt. }\%] \leq C1 \leq 88\ [\text{wt. }\%] \tag{1-2}$$

$$40\ [\text{wt. }\%] \leq C1 \leq 80\ [\text{wt. }\%] \tag{1-3}$$

2) Processing in Step 1 (Production Step of a Liquid, Low Molecular Weight Polymer Mixture)

The mixing of the raw materials (aspartic acid, the acidic catalyst) in step 1 is generally effected by directly mixing them together. In some instances, this mixing may be conducted by either dissolving or dispersing aspartic acid and/or the acidic catalyst in a solvent (a polar solvent such as water, an alcohol or a ketone). When a solvent other than water is employed, however, it is preferred to fully remove it from the reaction system prior to the initiation of the reaction so that side reactions can be avoided. It is more preferred to remove such a non-water solvent from the system before the initiation of the reaction until its concentration drops to 0 wt. %.

After mixing with the acidic catalyst, water may be formed as a result of condensation of aspartic acid. Making use of the water so formed, it is also possible to more efficiently conduct the mixing of the acidic catalyst and aspartic acid.

The processing of step 1 may be conducted preferably in a temperature range of from 5 to 400° C., more preferably in a temperature range of from 80 to 350° C., still more preferably in a temperature range of from 100 to 250° C., particularly preferably in a temperature range of from 130 to 200° C. The reaction mixture, which is composed primarily of aspartic acid and the acidic catalyst, takes a variety forms such as a slurry and a paste depending on the reaction conditions such as the amount of the acidic catalyst and the heating temperature and, when heated further, then changes into a liquid form. An unduly low temperature generally leads to a need of a longer reaction time for the production of a liquid, low molecular weight polymer mixture having a weight average molecular weight in the range of the numerical formula (2). A large reactor is therefore needed, thereby making the designing of equipment difficult. An excessively high temperature, on the other hand, generally results in initiation of polymerization in a non-uniform state before the acidic catalyst and aspartic acid are fully mixed, thereby involving a potential problem that a non-uniform reaction product may be formed locally.

The pressure of step 1 can be determined as desired. The pressure should be set at such a level that the water in the system can be efficiently reduced at a temperature at which heating is conducted. The pressure is preferably 0.000001 to 50 MPa, more preferably 0.00001 to 10 MPa, particularly preferably 0.0001 to 1 MPa. Use of an unduly low pressure generally results in considerable foaming upon evaporation of water in the course of the production of the liquid, low molecular weight polymer mixture, so that the volume efficiency is lowered. Use of an excessively high temperature, on the other hand, generally requires a high pressure-resistant reactor so that, when mass-production is intended, the designing of equipment becomes difficult.

No particular limitation is imposed on the time required for step 1. However, step 1 may be completed generally in 1 second to 20 hours, preferably in 10 seconds to 5 hours, more preferably in 1 minute to 3 hours, especially preferably in 5 minutes to 2 hours. Adequate setting of the heating time makes it possible to obtain the liquid, low molecular weight polymer mixture without marked coloring and/or modification. The liquid, low molecular weight polymer mixture can be stored or otherwise held as needed for a desired time including the above-described range of time.

The processing of step 1 may preferably be conducted under conditions that the concentration of oxygen in the system is lowered or under conditions that the concentration of oxygen in the system is 0%. Described specifically, it is desired to conduct the processing of step 1 in the above-described inert gas.

3) Production Equipment

The production of the liquid, low molecular weight polymer mixture in step 1 can be practiced either continuously or batchwise. No particular limitation is imposed on equipment for the production of the liquid, low molecular weight polymer mixture, and any equipment can be used insofar as it permits the mixing and heating of the raw materials as described above. The mixing and heating of the raw materials may be conducted separately in two or more units of equipment. Desired equipment can be used, including as-a specific example a stirred tank, a reactor equipped with a planetary mixer, or a single-screw or twin-screw kneader. Depending on the nature (for example, viscosity, etc.) of the liquid, low molecular weight polymer mixture, a reactor should be chosen such that a uniformly stirred state can be obtained.

The heating in the production step of the liquid, low molecular weight polymer mixture can be effected by bringing the reaction mixture into direct or indirect contact with a heating medium.

Equipment usable for the production of the liquid, low molecular weight polymer mixture in the present invention include those disclosed in "7. Stirring" (pages 421–454) and "6. Heat Transfer and Evaporation" (pages 343–420) of "KAGAKU KOGAKU BINPAN (Handbook of Chemical Engineering), Revised 6$^{th}$ Edition" (Compiled by: The Society of Chemical Engineers, Japan; Published by: MARUZEN CO., LTD.; 1999).

4) Weight Average Molecular Weight

In step 1, a liquid, low molecular weight polymer mixture is produced. This polymer mixture contains polysuccinimide which has, as a molecular weight thereof, a weight average molecular weight $Mw1$ indicated by the above-described numerical formula (2). If this weight average molecular weight $Mw1$ is lower than the range of the numerical formula (2), the processing in the subsequent steps may be rendered difficult in general. Described specifically, a solid, low molecular weight polymer mixture may not be obtained in step 2 (production step of a solid, low molecular weight polymer mixture), or melting or fusion aggregation of a solid, low molecular weight polymer mixture may take place in step 3 (solid-state polymerization step) If the weight average molecular weight $Mw1$ is higher than the range of the numerical formula (2), a very long residence time is generally required in the equipment in which a liquid, low molecular weight polymer mixture is produced, and accordingly, there is a potential problem that side reactions may occur.

In the present invention, the weight average molecular weight $Mw1$ of the polysuccinimide in the liquid, low molecular weight polymer mixture produced in step 1 may be preferably in a range indicated by the below-described numerical formula (2-1), more preferably in a range indicated by the below-described numerical formula (2-2), particularly preferably in a range indicated by the below-described numerical formula (2-3).

$$1.5\times10^4 \leq Mw1 \leq 1.2\times10^5 \tag{2-1}$$

$$2.0\times10^4 \leq Mw1 \leq 9.0\times10^4 \tag{2-2}$$

$$2.5\times10^4 \leq Mw1 \leq 7.0\times10^4 \tag{2-3}$$

[7] Step 2 (Production Step of a Solid, Low Molecular Weight Polymer Mixture)

Step 2 (production step of a solid, low molecular weight polymer mixture) can be practiced continuously and/or batchwise.

No particular limitation is imposed on step 1, insofar as a solid, low molecular weight polymer mixture—in which a weight concentration $C2$ of the acidic catalyst based on a total weight of a weight of low molecular weight polysuccinimide and a weight $WA2$ of the acidic catalyst is indicated by the below-described numerical formula (3), and the weight $WA2$ of the acidic catalyst is indicated by the below-described numerical formula (4), and the polysuccinimide has a weight average molecular weight $Mw2$ indicated by the below-described numerical formula (5), and the solid, low molecular weight polymer mixture being free from melting under reaction conditions of the following step 3)—is produced from the liquid, low molecular weight polymer mixture produced in step 1:

$$5\,[\text{wt. \%}] \leq C2 \leq 55\,[\text{wt. \%}] \tag{3}$$

$$WA2 \leq WA1 \tag{4}$$

$$1.0\times10^4 \leq Mw2 \leq 2.0\times10^5 \tag{5}$$

A preferred embodiment of step 2 comprises the following step 2-1) and solid-liquid separation step 2-2): 2-1)

adding an extraction solvent, which has such function as not substantially dissolving the low molecular weight polysuccinimide but dissolving the acidic catalyst at least in part, to the liquid, low molecular weight polymer mixture produced in step 1 to have at least a part of the acidic catalyst moved from the liquid, low molecular weight polymer mixture into a phase of the extraction solvent, thereby producing a slurry which comprises a solid, low molecular weight polymer mixture, said mixture containing the acidic catalyst at a reduced content and low molecular weight polysuccinimide, and an extract containing the thus-extracted acid catalyst and the extraction solvent; and 2-2) separating the slurry produced in step 2-1 into the solid, low molecular weight polymer mixture, said mixture containing the acidic catalyst at the reduced content and the low molecular weight polysuccinimide, and said extract containing the thus-extracted acid catalyst and the extraction solvent.

Another preferred embodiment of step 2 comprises, in addition to step 2-1 and step 2-2, the following step: 2-3) drying the solid, low molecular weight polymer mixture, which has been separated in step 2-2, to produce a solid, low molecular weight polymer mixture substantially free of the extraction solvent.

These step 2-1 (slurry preparation step), step 2-2 (solid-liquid separation step) and step 2-3 (drying step) can be each practiced continuously and/or batchwise.

The term "solid" as used herein in connection with the low molecular weight polymer mixture obtained in step 2 has such a meaning as embracing not only a solid form but also a rubbery solid (elastomer) form and a form in which particles have their own shapes.

1) Amount of the Acidic Catalyst

In step 2, the solid, low molecular weight polymer mixture in which the weight concentration C2 of the acidic catalyst based on the total weight of the weight of the low molecular weight polysuccinimide and the weight WA2 of the acidic catalyst is indicated by the above-described numerical formula (3) is produced. If the concentration C2 of the acidic catalyst is lower than the range of the numerical formula (3), a polysuccinimide is eventually produced with a small molecular weight through the step 3 (solid-state polymerization step). If the concentration C2 of the acidic catalyst conversely exceeds the range of the numerical formula (3) and the acidic catalyst remains in an excess amount, the solid, low molecular weight polymer mixture may not be able to retain its solid form in the subsequent step (for example, step 3).

In the present invention, the weight concentration C2 of the acidic catalyst based on the total weight of the weight of the low molecular weight polysuccinimide and the weight WA2 of the acidic catalyst may be preferably in a range indicated by the below-described numerical formula (3-1), more preferably in a range indicated by the below-described numerical formula (3-2), particularly preferably in a range indicated by the below-described numerical formula (3-3).

$$9 \text{ [wt. \%]} \leq C2 \leq 53 \text{ [wt. \%]} \quad (3\text{-}1)$$

$$23 \text{ [wt. \%]} \leq C2 \leq 50 \text{ [wt. \%]} \quad (3\text{-}2)$$

$$33 \text{ [wt. \%]} \leq C2 \leq 48 \text{ [wt. \%]} \quad (3\text{-}3)$$

2) Step 2-1 (Preparation Step of a Slurry)

Step 2-1 (preparation step of a slurry) is a step in which at least a portion of the acidic catalyst is extracted with an extraction solvent from the liquid, low molecular weight polymer mixture produced in step 1.

In this step 2-1, a solvent—which has such function as not substantially dissolving the low molecular weight polysuccinimide but dissolving the acidic catalyst at least in part—is used. For example, at least one of organic solvents, mixtures of organic solvents and water and/or the acidic catalyst, water, and a mixture of water and the acidic catalyst can be used. A desired extraction solvent can be chosen primarily in view of the extracting ability to the acidic catalyst, the temperature and pressure conditions upon conducting the extraction, and the stability of the solvent itself.

As an index of the extracting ability of an extraction solvent, a specific induction capacity $\epsilon_r$ can be mentioned. In the present invention, an extraction solvent the specific induction capacity at 25° C. of which is preferably 2 or higher, more preferably 10 or higher, especially preferably 15 or higher, most preferably 19 or higher is used.

Illustrative of the organic solvent useful as the extraction solvent are alcohols having 1 to 20 carbon atoms, ketones having 3 to 20 carbon atoms, ethers having 3 to 20 carbon atoms, and acetate esters having 3 to 20 carbon atoms. Specific examples can include alcohols such as methanol, ethanol, isopropyl alcohol, 1-butanol, 2-butanol, i-butyl alcohol, t-butyl alcohol, 1-pentanol, 2-pentanol, 3-pentanol, isoamyl alcohol, 4-methyl-2-pentanol, 1-hexanol, 2-hexanol, 3-hexanol, cyclohexanol, 1-heptanol, 2-heptanol, and 1-octanol; ketones such as acetone, methyl ethyl ketone, methyl isobutyl ketone, 2-hexanone, 3-hexanone, 2-pentanone, and 3-pentanone; ethers such as diisopropyl ether; and acetate esters such as methyl acetate, ethyl acetate, propyl acetate, butyl acetate, pentyl acetate, and hexyl acetate. Among these, preferred organic solvents are methanol, ethanol, isopropyl alcohol, 1-butanol, 2-butanol, i-butyl alcohol, t-butyl alcohol, 1-pentanol, 2-pentanol, isoamyl alcohol, 1-hexanol, 1-octanol, acetone, methyl isobutyl ketone, diisopropyl ether, and butyl acetate. More preferred organic solvents are methanol, ethanol, isopropyl alcohol, 1-butanol, 2-butanol, i-butyl alcohol, t-butyl alcohol, 1-pentanol, 2-pentanol, acetone, and diisopropyl ether. Particularly preferred organic solvents are methanol, isopropyl alcohol, 1-butanol, 2-butanol, i-butyl alcohol, acetone, and diisopropyl ether. Most preferred organic solvents are methanol, isopropyl alcohol, and acetone.

When an organic solvent which forms an azeotropic mixture with water is used as an extraction solvent, the organic solvent may be used in the form of a mixture with water contained therein in such an amount as providing an azeotropic composition.

It is also possible to use an organic solvent mixture with water contained therein to saturation solubility under temperature and pressure conditions for the extraction. Conversely, it is also possible to use a water mixture with an organic solvent contained therein to saturation solubility under temperature and pressure conditions for the extraction. In the case of an organic solvent which is completely miscible with water, the organic solvent and water can be used by mixing them at a desired ratio. The extraction solvent may contain the acidic catalyst. The content of the acidic catalyst may be set at such a level as not lowering the extracting ability of the extraction solvent such that the amount of the acidic catalyst remaining in the polymer can be controlled within the above-described range. The content of the acidic catalyst in the extraction solvent may be generally 90 wt. % or lower, preferably 60 wt. % or lower, more preferably 40 wt. % or lower, particularly preferably 20 wt. % or lower, most preferably 10 wt. % or lower. An excessively high concentration of the acidic catalyst in the extraction solvent makes it difficult to set the weight concentration of the acidic catalyst within the above-described range in the production step of the solid polymer mixture.

By removing the acidic catalyst from the liquid, low molecular weight polymer mixture to appropriate extent with such an extraction solvent in step 2-1, the phase locally changes in the mixture so that a slurry containing phases of a solid, low molecular weight polymer mixture is obtained.

Examples of equipment for use in step 2-1 can include a stirred tank, a fixed bed extractor, a moving bed extractor, and a Rotocel extractor. Equipment and methods usable for the extraction in the present invention include those disclosed in "12. Extraction and Liquid-Liquid Reaction" (pages 637–688), "7. Stirring" (pages 421–454), and "6. Heat Transfer and Evaporation" (pages 343–420) of "KAGAKU KOGAKU BINRAN (Handbook of Chemical Engineering), Revised 6$^{th}$ Edition" (Compiled by: The Society of Chemical Engineers, Japan; Published by: MARUZEN CO., LTD.; Published in: 1999).

Specific examples of the processing in step 2-1 can include: charging of the above-described extraction solvent in a stirred tank, followed by the introduction of the liquid, low molecular weight polymer mixture under stirring; and charging of the liquid, low molecular weight polymer mixture in a stirred tank, followed by the introduction of extraction solvent under stirring.

The extraction in step 2-1 is conducted as either single-stage extraction or multi-stage extraction. In multi-stage extraction, the extraction solvent is used in either a counter current manner or a cocurrent manner. Counter current extraction is particularly preferred as it makes it possible to reduce the amount of the extraction solvent to be used. In multi-stage extraction, the extraction solvent with the acidic catalyst contained therein may be used in at least some of the stages.

The used amount of the extraction solvent governs the concentrations of the acidic catalyst in the solid, low molecular weight polymer mixture produced in this step. The concentration of the acidic catalyst in the solid, low molecular weight polymer mixture is set within the range of the numerical formula (3). The adjustment to the appropriate concentration of the acidic catalyst makes it possible to retain a solid form during the solid-state polymerization state and further to produce polysuccinimide with the intended weight average molecular weight. Described more specifically, the weight average molecular weight of polysuccinimide to be obtained eventually can be controlled to a desired value depending on the amount(s) of the organic solvent and/or water to be used relative to the total amount of the acidic catalyst contained in the liquid, low molecular weight polymer mixture and the acidic catalyst contained in the extraction solvent.

The amount of the extraction solvent to be used may range preferably from 0.1 to 100 parts by weight, more preferably from 0.3 to 50 parts by weight, particularly preferably from 0.5 to 20 parts by weight, most preferably from 1 to 10 parts by weight, all per part by weight of the above-described total weight of the acidic catalyst. Use of the extraction solvent in an excessively large amount leads to a low concentration of the acidic catalyst in the extract, so that upon separation of the acidic catalyst and the extraction solvent from each other after the extraction, the efficiency is lowered. Use of the extraction solvent in an unduly small amount, on the other hand, leads to an increase in the concentration of the acidic catalyst in the extract, so that the concentration of the acidic catalyst remaining in the solid, low molecular weight polymer mixture increases. To reduce the amount of the extraction solvent to be used and also to conduct the extraction with good efficiency, multi-stage counter current extraction is preferred. When conducting multi-stage extraction, it is preferred to conduct the extraction in each stage after separating the solid, low molecular weight polymer mixture and the extract from each other to possible maximum extent subsequent to completion of the extraction in the preceding stage. Described specifically, the separation is conducted until the amount of the extract contained per 100 parts by weight of the solid, low molecular weight polymer mixture is reduced generally to 50 parts by weight or less, preferably to 30 parts by weight or less, more preferably to 10 parts by weight or less, particularly preferably to 5 parts by weight or less, most preferably to 1 part by weight or less.

The separation between the extract and the solid, low molecular weight polymer mixture can be conducted specifically in a step making use of a filter, a centrifugator, sedimentation equipment or flotation equipment or a combination thereof. Incidentally, subsequent to the separation of the solid, low molecular weight polymer mixture and the extract from each other, the extract still contained in the solid, low molecular weight polymer mixture may be subjected to displacement washing by using the same or different extraction solvent. The amount of the extraction solvent to be used in each displacement washing may range preferably from 0.01 to 10 parts by weight, more preferably from 0.05 to 5 parts by weight, particularly preferably from 0.1 to 2 parts by weight, all per part by weight of the solid, low molecular weight polymer mixture.

Upon production of the solid, low molecular weight polymer mixture, the temperature may preferably be from 5 to 300° C. If this temperature is lower than 5° C., the residual concentration of the acidic catalyst in the solid, low molecular weight polymer mixture becomes higher. If the temperature exceeds 300° C., the solid, low molecular weight polymer mixture is modified at certain parts thereof and is lowered in molecular weight, and in some instances, is colored, leading to a reduction in quality. In general, this temperature may range preferably from 10 to 200° C., more preferably from 15 to 150° C., particularly preferably from 20 to 100° C.

No particular limitation is imposed on the pressure in step 2-1. It is preferred to set the pressure in step 2-1 in view of physical properties of the extraction solvent to be employed. If the temperature at which the extraction is conducted is lower than the critical temperature of the extraction solvent, for example, the extraction pressure may be set preferably at such a level that a liquid phase exists at least locally. If the extraction is conducted, for example, under an atmosphere of an inert gas such as nitrogen, carbon dioxide or argon, it is preferred to pressurize with the gas to a level equal to or higher than the saturated vapor pressure of the extraction solvent at the extraction temperature. If the temperature at which the extraction is conducted is higher than the critical temperature of the extraction solvent, the extraction pressure may be set preferably at such a level that at least a portion of the acidic catalyst is dissolved in the extraction solvent.

When multi-stage extraction is conducted, the temperatures and/or pressures in the respective stages can be set at different values within the above-described ranges, respectively.

The time of the extraction in step 2-1 may range generally from 0.5 second to 12 hours, preferably from 1 second to 5 hours, more preferably from 3 seconds to 3 hours, particularly preferably from 5 seconds to 2 hours, most preferably from 10 seconds to 60 minutes. The term "extraction time" as used herein means a time during which the solid, low molecular weight polymer mixture and the extraction solvent and/or the extract remain in contact with each other at the temperature at which the extraction is being conducted.

If a long time is needed for the extraction, large equipment is required, thereby making the designing of the equipment difficult. If the extraction time is too short, on the other hand, there is a potential problem in that the adjustment of the concentration of the acidic catalyst in step 2-1 may not be conducted fully.

3) Step 2-2 (Solid-liquid Separation Step)

As separation processing instep 2-2, a method similar to the above-described separation processing conducted between the respective stages in the multi-stage extraction can be mentioned. Described specifically, separation processing can be conducted in a step making use of a filter, a centrifugator, sedimentation equipment or flotation equipment or a combination thereof.

4) Step 2-3 (Drying Step)

Further drying may be applied to the solid, low molecular weight polymer mixture obtained in step 2-2 (solid-liquid separation step). In this step 2-3 (drying step), the extraction solvent is driven off from the solid, low molecular weight polymer mixture, so that the solid, low molecular weight polymer mixture is obtained in a form substantially free of the solvent.

This drying processing can be effected under at least one pressure condition out of a vacuum system, an atmospheric pressure system and an elevated pressure system. Described specifically, continuous or batchwise drying processing can be conducted using, for example, at least one equipment selected from the group consisting of a hot-air material-moving dryer, a material-mixing dryer (fluidized bed dryer or the like), a material-moving and material-fixed dryer, a cylindrical dryer, an infrared dryer, a microwave dryer and a superheated steam dryer.

Equipment and methods usable in step 2-3 include those disclosed in "14. Moisture Control, Water Cooling and Drying" (pages 735–788), "7. Stirring" (pages 421–454), and "6. Heat Transfer and Evaporation" (pages 343–420) of "KAGAKU KOGAKU BINRAN (Handbook of Chemical Engineering), Revised $6^{th}$ Edition" (Compiled by: The Society of Chemical Engineers, Japan; Published by: MARUZEN CO., LTD.; Published in: 1999).

To avoid coloring or modification of the solid, low molecular weight mixture, the drying processing may preferably be conducted generally under conditions of a lowered oxygen concentration or 0% oxygen concentration in the system, specifically, may preferably be conducted in the above-described inert gas.

It is preferred to conduct the drying processing such that during the drying, the temperature of the solid, low molecular weight polymer mixture remains within a range of from 5 to 300° C. If the temperature is lower than 5° C., a longer time is required for the drying of the solid, low molecular weight polymer mixture. If the temperature is higher than 300° C., on the other hand, the solid, low molecular weight polymer mixture, due to inclusion of the extraction solvent, is modified at certain parts thereof and is lowered in molecular weight, and in some instances, is colored, leading to a reduction in quality. The temperature of the solid, low molecular weight polymer mixture during the drying may range preferably from 10 to 200° C., more preferably from 20 to 150° C., particularly preferably from 30 to 120° C.

5) Weight Average Molecular Weight of a Solid, Low Molecular Weight Polymer Mixture In step 2, a solid, low molecular weight polymer mixture the weight average molecular weight Mw2 falls within the range indicated by the numerical formula (5) is produced. It is preferred to conduct step 2 such that the weight average molecular weight Mw2 of a solid, low molecular weight polymer mixture, which is to be obtained through step 2, is not substantially lower than the weight average molecular weight Mw1 of the liquid, low molecular weight polymer mixture and moreover, is at such a level as not causing melting (liquefaction) of the solid, low molecular weight polymer mixture in step 3 (solid-state polymerization step).

In the present invention, the weight average molecular weight Mw2 of the polysuccinimide in the solid, low molecular weight polymer mixture produced in step 2 may be preferably in a range indicated by the below-described numerical formula (5-1), more preferably in a range indicated by the below-described numerical formula (5-2), particularly preferably in a range indicated by the below-described numerical formula (5-3).

$$1.5\times10^4 \leq Mw2 \leq 1.2\times10^5 \tag{5-1}$$

$$2.0\times10^4 \leq Mw2 \leq 9.0\times10^4 \tag{5-2}$$

$$2.5\times10^4 \leq Mw2 \leq 7.0\times10^4 \tag{5-3}$$

7) Particle Size

As a method for determining the particle size in step 2, there is, for example, a method which makes use of standard sieves. Measurement of a particle size distribution and setting of a maximum particle diameter can be achieved by conducting dry or wet sifting while using the standard sieves, for example, together with a mechanical shaking apparatus.

As another method for determining the particle size, there is also a measuring method which relies upon laser diffraction scattering analysis. According to this method, particles are dispersed usually in a poor solvent for a component contained in the target of the measurement, and their particle size distribution can then be measured by laser diffraction scattering analysis. Illustrative of specific instruments is a particle size analyzer (Model: 9320-X100) manufactured by Leeds & Northrup, Inc. According to this instrument, a volume average diameter defined by the below-described numerical formula (15) can be measured using particle volumes Vi and particle sizes di.

$$\text{Volume average diameter} = \Sigma(Vi \times di)/\Sigma(Vi) \tag{15}$$

Assuming that particles are spherical, a number average diameter defined by the below-described numerical formula (16) can also be measured.

Number average diameter $$= (\Sigma(Vi)/di^2)/(\Sigma(Vi)/di^3) \tag{16}$$

In the step 2, particles are obtained—wherein the biggest particle diameter is generally 10 mm or less, preferably 3 mm or less, more preferably 1 mm or less, particularly preferably 700 μm or less, most preferably 400 μm or less—from the liquid, low molecular weight polymer mixture.

[8] Step 3 (Solid-state Polymerization Step)

Step 3 (solid-state polymerization step) can be practiced continuously and/or batchwise. No particular limitation is imposed on step 3 insofar as a solid, high molecular weight polymer mixture—which contains high molecular weight polysuccinimide, the weight average molecular weight Mw3 of which satisfies the below-described numerical formulas (6), (7) and (8) at the same time, and the acidic catalyst—can be produced by subjecting the solid, low molecular weight polymer mixture produced in step 2 to solid-state polymerization at 120 to 350° C.

$$4.0 \times 10^4 \leq Mw3 \leq 1.0 \times 10^6 \quad (6)$$

$$Mw1 \leq Mw3 \quad (7)$$

$$Mw2 \leq Mw3 \quad (8)$$

If the solid, low molecular weight polymer mixture obtained in step 2 is in such a form as containing the extraction solvent and/or the like, step 3 (solid-state polymerization step) may also be conducted as the above-described step 2-3 (drying processing). By subjecting to solid-phase polymerization the solid, low molecular weight polymer mixture which contains low molecular weight polysuccinimide having a weight average molecular weight in the above-described range and the acidic catalyst at the above-set concentration, a solid, high molecular weight polymer mixture can be obtained without occurrence of liquefaction by melting, bulk solidification by fusion aggregation or the like during the solid-state polymerization and generally, with no substantial difference in external appearance (for example, particle size or the like) from the solid, low molecular weight polymer mixture.

1) Processing in the Solid-state Polymerization Step

In step 3, the solid, low molecular weight polymer mixture obtained in the production step of solid, low molecular polymer mixture is heated, and is polymerized while retaining its solid form.

To avoid coloring or modification of the resulting product, the solid-state polymerization may preferably be conducted generally under conditions of a lowered oxygen concentration or 0% oxygen concentration in the system, specifically, may preferably be conducted in the above-described inert gas.

It is preferred to conduct the solid-state polymerization by continuously feeding an inert gas into the reaction system. The inert gas is used by bring it into contact with the solid, low molecular weight polymer mixture in either a counter current manner or a cocurrent manner. Using the inert gas as a heating medium, the inert gas may be brought into direct contact with the reaction mixture to heat the same.

The temperature at which the solid-state polymerization is conducted is set generally at 120 to 350° C., preferably at 140 to 320° C., more preferably at 160 to 300° C., particularly preferably at 170 to 280° C., most preferably at 180 to 260° C. An unduly low temperature generally results in polysuccinimide with a lower weight average molecular weight. An excessively high temperature, on the other hand, generally leads to coloring, modification or in some instances, pyrolysis of the polymer. The solid-state polymerization is conducted in the above-described inert gas. In the present invention, the solid-state polymerization can be conducted under one pressure condition out of a vacuum system, an atmospheric pressure system and an elevated pressure system. The pressure range may be preferably from 0.000001 to 50 MPa, more preferably from 0.00001 to 10 MPa, still more preferably from 0.0001 to 5 MPa. If the pressure is excessively high, a high pressure reactor is needed. If the pressure is unduly low, it is difficult to design equipment such that it can meet a high vacuum.

The reaction time becomes shorter as the reaction temperature becomes higher, although the reaction time varies depending on reaction conditions such as temperature and pressure and also on equipment conditions. The reaction time may be range preferably from 1 second to 50 hours, more preferably from 1 minute to 20 hours, particularly preferably from 10 minutes to 8 hours, most preferably from 30 minutes to 5 hours. An unduly short reaction time may generally result in polysuccinimide the molecular weight of which has not been increased sufficiently. An excessively long reaction time, on the other hand, may generally lead to colored or modified polysuccinimide. This coloring or modification becomes more conspicuous with time.

1-1) Solid-state Polymerization in Vacuum System

When the solid-state polymerization is conducted in a vacuum system, no particular limitation is imposed on the pressure of the reaction system insofar as a solid-state polymerization reaction substantially proceeds and polysuccinimide having an intended weight average molecular weight is obtained.

In solid-state polymerization in a vacuum system, the pressure of the reaction system is set in view of the polymerization time, the weight average molecular weight (Mw) intended to be reached by the solid-state polymerization, and the like. More specifically, a pressure lower than 0.1 MPa is chosen from the above-described pressure range.

1-2) Solid-state Polymerization in Atmospheric Pressure System

The term "solid-state polymerization in an atmospheric pressure system" specifically means polymerization which is conducted under a pressure around 0.1 MPa chosen from the above-described pressure range (more specifically, 0.01 to 1.0 MPa).

Solid-state polymerization in an atmospheric pressure system is conducted by causing an inert gas to flow through the system. In terms of flow rate per unit time and unit weight of the solid, low molecular weight polymer mixture [NL/{(hour)·(g-solid, low molecular weight polymer mixture)}], the amount of the inert gas to be used may range generally from 0.0001 to 100, preferably from 0.001 to 60, more preferably from 0.01 to 40, particularly preferably from 0.05 to 30, most preferably from 0.5 to 20. The abbreviation "NL" as used herein means the volume (liters) of the gas in the standard state. An unduly low flow rate generally results in polysuccinimide the weight average molecular weight of which is lower. An unduly high flow rate, on the other hand, generally makes it difficult to handle the solid, low molecular weight polymer mixture.

On the other hand, the linear velocity (cm/sec) of the inert gas in the reactor may range generally from 0.01 to 1000, preferably from 0.05 to 500, more preferably from 0.1 to 100, particularly preferably from 0.3 to 60, most preferably from 0.5 to 30. An unduly low linear velocity generally results in polysuccinimide the weight average molecular weight of which is lower. An unduly high linear velocity, on the other hand, generally makes it difficult to handle the solid, low molecular weight polymer mixture.

1-3) Solid-state Polymerization in Elevated Pressure System

When solid-state polymerization is conducted in an elevated pressure system, no particular limitation is imposed on the pressure of the reaction system insofar as a solid-state polymerization reaction substantially proceeds and polysuccinimide having an intended weight average molecular weight is obtained.

In solid-state polymerization in an elevated system, the pressure of the reaction system is determined in view of the time required for the polymerization, the efficiency of removal of water formed by polycondensation, and the like. More specifically, a pressure higher than 0.1 MPa is chosen from the above-described pressure range.

2) Average Molecular Weight

Between step 2 (production step of solid, low molecular weight polymer mixture) and step 3 (solid-state polymerization step) and/or in the course of step 3 (solid-state polymerization step), solid-state polymerization may be conducted, as needed, by forming the solid, low molecular weight polymer mixture and/or the solid, high molecular weight polymer mixture into fine particulate reaction mixture(s) in equipment equipped with at least one of grinding function and classifying function.

The formation of the fine particulate reaction mixture(s) in the present invention may contribute to an increase in the weight average molecular weight of polysuccinimide contained in a solid, high molecular weight polymer mixture to be produced. Further, the formation of the fine particulate reaction mixture in the present invention may contribute to an increase in the weight average molecular weight of a solid, high molecular weight polymer mixture to be produced by solid-state polymerization especially in an atmospheric pressure system or an elevated pressure system.

In the present invention, it is also possible to form, as needed, fine particular reaction mixture(s) the above-described volume average diameter of (each of) which ranges preferably from 1 to 500 μm, more preferably from 5 to 300 μm, particularly preferably from 10 to 200 μm, most preferably from 30 to 100 μm.

As an alternative condition in the present invention, it is also possible to form, as needed, fine particular reaction mixture(s) the above-described number average diameter of (each of) which ranges preferably from 0.01 to 500 μm, more preferably from 0.1 to 200 μm, particularly preferably from 0.5 to 100 μm, most preferably from 1 to 50 μm.

If the volume average diameter(s) and/or number average diameter(s) are too small, the processing to handle the fine particulate reaction mixture(s) becomes difficult in general. If the volume average diameter(s) and/or number average diameter(s) are too large, on the other hand, polysuccinimide is obtained generally with a large molecular weight distribution after the solid-state polymerization step.

In the present invention, grinding and/or classification may be conducted, as needed, to produce fine particulate reaction mixture(s) the above-described volume average diameter(s) and/or number average diameter(s) of which fall within the above-described range(s).

The grinding can be conducted continuously or batchwise by using a dry and/or wet grinding machine. The classification can be carried out continuously or batchwise by using a dry and/or wet classifier. Further, it is also possible to use equipment which is provided with both a grinding mechanism and a classifying mechanism.

If the volume average diameter(s) and/or number average diameter(s) of the fine particulate reaction mixture(s) are smaller than the above-described range(s), granulation in self-granulation system and/or forced granulation system may be conducted to adjust them to the above-described ranges.

3) Reactor

Step 3 can be conducted either continuously or batchwise. For the solid-state polymerization step, a suitable reactor can be chosen depending on the reaction conditions (temperature, pressure, etc.) under which the solid-state polymerization is to be conducted. Described specifically, continuous or batchwise drying processing can be conducted, for example, by using at least one equipment selected from the group consisting of a hot-air material-moving dryer, a material-mixing dryer (fluidized bed dryer or the like), a material-moving and material fixed dryer, a cylindrical dryer, an infrared dryer, a microwave dryer and a superheated steam dryer.

Equipment and methods usable in step 3 can also include those disclosed in "14. Moisture Control, Water Cooling and Drying" (pages 735–788), "7. Stirring" (pages 421–454), and "6. Heat Transfer and Evaporation" (pages 343–420) of "KAGAKU KOGAKU BINRAN (Handbook of Chemical Engineering), Revised 6$^{th}$ Edition" (Compiled by: The Society of Chemical Engineers, Japan; Published by: MARUZEN CO., LTD.; Published in: 1999).

Further, step 3 can also be conducted continuously or batchwise by using at least one equipment selected from a fluidized bed reactor, a moving bed reactor, a fixed bed reactor, a mixing-dryer-type reactor or the like.

Step 3 can be conducted by bringing the solid, low molecular weight polymer mixture into direct and/or indirect contact with a heating medium.

4) Weight Average Molecular Weight

In step 3 (solid-state polymerization step), a high molecular weight polysuccinimide the weight average molecular weight Mw3 of which satisfies the following numerical formulas (6) to (8) at the same time is produced by choosing the above-described various conditions as desired. In the present invention, the weight average molecular weight Mw3 of the high molecular weight polysuccinimide may be preferably in a range indicated by the below-described numerical formula (6-1), more preferably in a range indicated by the below-described numerical formula (6-2), particularly preferably in a range indicated by the below-described numerical formula (6-3).

$$6.0 \times 10^4 \leq Mw3 \leq 1.0 \times 10^6 \quad (6\text{-}1)$$

$$8.0 \times 10^4 \leq Mw3 \leq 1.0 \times 10^6 \quad (6\text{-}2)$$

$$1.0 \times 10^5 \leq Mw^3 \leq 1.0 \times 10^6 \quad (6\text{-}3)$$

Describing the upper limit and the lower limit separately, a derivative good in quality and/or performance (for example, a superabsorbent polymer, a polyaspartic acid salt, or the like) can be obtained by setting the lower limit of Mw3 at $4.0 \times 10^4$ or higher, preferably at $6.0 \times 10^4$ or higher, more preferably at $8.0 \times 10^4$ or higher, particularly preferably at $1.0 \times 10^5$ or higher, most preferably at $1.2 \times 10^5$ or higher. On the other hand, the production of a solid, high molecular weight polymer mixture can be conducted without needing a long reaction time for the solid-state polymerization step by setting the upper limit of Mw3 at $1.0 \times 10^6$ or lower, preferably at $7.0 \times 10^5$ or lower, more preferably at $5.0 \times 10^5$ or lower, particularly preferably at $3.0 \times 10^5$ or lower, most preferably at $2.0 \times 10^5$ or lower.

[9] Post-treatment Step

1) Purification of Solid, High Molecular Weight Polymer Mixture

After the solid-state polymerization, the acidic catalyst contained in the polysuccinimide may be removed by conducting washing at 10 to 300° C. with the above-described extraction solvent which is a poor solvent for the polysuccinimide. Washings with the acidic catalyst contained therein can be used as an extraction solvent in the slurry preparation step either after conducting purification as needed or without purification.

As an alternative, the acidic catalyst contained in the polysuccinimide may be washed and removed subsequent to the solid-state polymerization by once dissolving the polysuccinimide in a good solvent [dimethylformamide (DMF), dimethyl sulfoxide or the like] for the polysuccinimide, reprecipitating the polysuccinimide with a poor solvent (methanol, isopropanol, acetone, water, or the like) for the polysuccinimide, conducting filtration and, if necessary, conducting rising with the poor solvent.

As a further alternative, polyaspartic acid or a salt thereof can be produced by hydrolyzing the polysuccinimide subsequent to the solid-state polymerization. This hydrolysis may be conducted after elimination of the acidic catalyst from the polysuccinimide, or it may be carried out on the polysuccinimide with the acidic catalyst still contained therein so that the hydrolysis can also be effected concurrently as neutralization of the acidic catalyst.

The amount of the acidic catalyst contained in the polysuccinimide can be determined usually by a method such as elemental analysis or fluorescent X-ray analysis. It is preferred to conduct the purification to reduce the concentration of the acidic catalyst in the polysuccinimide to 5 wt. % or lower, preferably to 1 wt. % or lower, more preferably to 0.5 wt. % or lower, particularly preferably to 0.2 wt. % or lower, most preferably to 0.1 wt. % or lower. Specifically, purification is conducted by repeating purification processing or using the solvent in a greater amount in the washing processing.

2) Recovery and Recycling of the Acidic Catalyst and/or the Extraction Solvent

Solutions with the acidic catalyst contained therein (extracts and washings) are recovered from the production step of the solid, low molecular weight polymer mixture and the above-described purification processing of the solid, high molecular weight polymer mixture. In the present invention, the acidic catalyst and/or the solvent may be reused for the production of polysuccinimide by separating the solvent from the solutions, which contain the acidic catalyst, as needed.

The present invention will hereinafter be described in detail by Examples. It is however to be noted that the present invention is not limited to the Examples. Incidentally, the physical properties and like in the Examples were measured by the following methods:

1) Concentration of Phosphoric Acid

Each weight concentration of phosphoric acid was determined in terms of orthophosphoric acid on the basis of elementary analysis data of phosphorus (P) element.

2) Average Molecular Weight

As the acidic catalyst was contained each reaction mixture (liquid, low molecular weight polymer mixture; solid, low molecular weight polymer mixture; solid, high molecular weight polymer mixture), the acidic catalyst was removed by cooling the reaction mixture to 25° C., placing the reaction mixture in a large excess of chilled methanol. (5° C.) and conducting stirring for 1 hour, conducting filtration to recover a solid polymer, packing the solid polymer in a glass-made column, and then causing methanol (30° C.) to continuously flow through the column. The solid polymer was then recovered by filtration, and dried in a vacuum. After the content of phosphoric acid in the polymer was confirmed to be 100 ppm or less, the polymer was weighed. The polymer was dissolved in DMF of molecular weight measuring grade (content of lithium bromide: 0.01 mol/liter), and a GPC analysis was conducted. Using polystyrene as a standard substance, its weight average molecular weight and number average molecular weight were determined.

3) Particle Size

The volume average diameter of each solid, low molecular weight polymer mixture or solid, high molecular weight polymer mixture was measured using a particle size analyzer (Model: 9320-X100) manufactured by Leeds & Northrup, Inc.

4) Analysis of Product

The polymer obtained in each Example was confirmed to be polysuccinimide by $^1$H-NMR and $^{13}$C-NMR.

5) Water Absorption

The water absorption of cross-linked polyaspartic acid in the Example was measured by the below-described tea bag method. The measurement of the water absorption by the tea bag method was conducted using distilled water and physiological saline as liquids to be absorbed. The dried superabsorbent polymer (0.02 g, particle diameter: 100 to 500 $\mu$m) was placed in a tea bag made of nonwoven fabric (80 mm×50 mm). The tea bag was immersed in an excess amount of the corresponding liquid (physiological saline or distilled water), in which the superabsorbent polymer was allowed to swell for 40 minutes. The tea bag was then pulled out. After the liquid was allowed to drip down for 10 seconds, the liquid was sucked out under capillary action on 24 sheets of tissue paper overlaid one over the other. The weight of the tea bag with the swollen polymer contained therein was measured. The above procedures were likewise repeated using, as a blank, a similar tea bag only. The weight of the blank and the weight of the superabsorbent polymer were subtracted from the weight of the tea bag with the swollen polymer contained therein. A value obtained by dividing the difference with the weight of the superabsorbent polymer, that is, a water absorption per unit weight of the superabsorbent polymer (g/g-superabsorbent polymer) was determined. Incidentally, the physiological saline was a 0.9 wt. % aqueous solution of sodium chloride.

EXAMPLE 1

Example of Production Step (Step 1) of Liquid, Low Molecular Weight Polymer Mixture Firstly, 85 wt. % phosphoric acid (173.2 g, 1.50 mol in terms of phosphoric acid) and L-aspartic acid (50.0 g, 0.38 mol) were successively charged in a 500-mL flask. The contents were stirred and mixed at 90° C. for 20 minute under atmospheric pressure in a nitrogen atmosphere to obtain a clear homogeneous solution (the concentration of phosphoric acid in the binary system of phosphoric acid and aspartic acid: 74.7 wt. %, phosphoric acid/aspartic acid molar ratio: 4.0).

While controlling the pressure within a range of from 500 to 10 mmHg (0.0667 to 0.0013 MPa), the reaction mixture was next heated to 180° C. in 20 minutes. After heated to 180° C., the reaction mixture was heated with stirring under 10 mmHg (0.0013 MPa) for 90 minutes. During that heating, the reaction mixture was allowed to progressively undergo a reaction in the form of a solution without undergoing foaming or the like. Subsequent to completion of the heating, a liquid, low molecular weight polymer mixture (183.4 g) was obtained as a slightly viscous, somewhat brownish, clear, homogeneous solution.

A portion of the liquid, low molecular weight polymer mixture was taken out, and the molecular weight of polysuccinimide contained in the mixture was determined in accordance with the above-described methods. Its weight average molecular weight was 45,000, and its number average molecular weight was 31,000.

EXAMPLE 2

Example (I) of Production Step (Step 2) of Solid, Low Molecular Weight Polymer Mixture Firstly, a portion of the liquid, low molecular weight polymer mixture obtained in Example 1 (step 1) was taken out, and was introduced into an extraction solvent (methanol) (198 g), which had been heated to 30° C., under stirring over 5 minutes. The liquid, low molecular weight polymer mixture so introduced was as much as 58.7 g.

After the introduction of the liquid, low molecular weight polymer mixture, stirring was continued at 30° C. for 30 minutes, and a slurry was obtained with white particles contained therein. After the slurry was allowed to cool down to room temperature, filtration was conducted to collect a powdery, solid, low molecular weight polymer mixture. Vacuum drying was then conducted at 50° C. to obtain the solid, low molecular weight polymer mixture in a powder form (18.8 g).

The volume average diameter of the solid, low molecular weight polymer mixture was analyzed without conducting grinding processing or the like. As a result, its volume average diameter was found to be 110 μm. By an elemental analysis, the solid, low molecular weight polymer mixture was confirmed to contain 38.5 wt. % of the acidic catalyst in terms of orthophosphoric acid. This acid catalyst concentration is equivalent to a phosphoric acid/polysuccinimide molar ratio of 0.62.

A portion of the solid, low molecular weight polymer mixture was taken out, and the molecular weight of polysuccinimide contained in the mixture was determined in accordance with the above-described methods. Its weight average molecular weight was 45,000, and its number average molecular weight was 31,000.

EXAMPLE 3

Example (II) of Production Step (Step 2) of Solid, Low Molecular Weight Polymer Mixture Firstly, a portion (60.5 g) of the liquid, low molecular weight polymer mixture obtained in Example 1 (step 1) was taken out, and was added to an extraction solvent (methanol) (240 g), which consisted of methanol and phosphoric acid (the concentration of phosphoric acid: 2.5 wt. %) and had been heated to 30° C. The resulting mixture was stirred for 5 minutes.

Stirring was continued at 30° for 30 minutes, and a slurry was obtained with white particles contained therein. After the slurry was allowed to cool down to room temperature, filtration was conducted to collect a powdery, solid, low molecular weight polymer mixture. Vacuum drying was then conducted at 50° to obtain the solid, low molecular weight polymer mixture in a powder form (19.2 g).

The volume average diameter of the solid, low molecular weight polymer mixture was analyzed without conducting grinding processing or the like. As a result, its volume average diameter was found to be 141 μm. By an elemental analysis, the solid, low molecular weight polymer mixture was confirmed to contain 38.1 wt. % of the acidic catalyst in terms of orthophosphoric acid. This acid catalyst concentration is equivalent to a phosphoric acid/polysuccinimide molar ratio of 0.61.

A portion of the solid, low molecular weight polymer mixture was taken out, and the weight average molecular weight of polysuccinimide contained in the mixture was determined in accordance with the above-described method. Its weight average molecular weight was 44,000.

EXAMPLE 4

Example (I) of Solid-state Polymerization Step (Step 3)

Firstly, a portion (5.8 g) of the solid, low molecular weight polymer mixture obtained in Example 2 (step 2) was charged, as was without grinding processing or the like, in a small dryer equipped with a mechanism that a cylindrical vessel was rotatable.

Under a flow of nitrogen at a low rate, vacuum solid-state polymerization was conducted at 220° C. and 1 mmHg (0.00013 MPa) for 4 hours while rotating the cylindrical vessel (at a rate of 10 revolutions per minute). During the solid-state polymerization, the reaction product retained its solid form without undergoing fusion aggregation or the like. After allowed to cool down to room temperature, a powdery, solid, high molecular weight polymer mixture (5.7 g) was collected in a form not different in external appearance from the solid, low molecular polymer mixture at the time of the charging.

Using a portion of the solid, high molecular weight polymer mixture, the volume average diameter of the solid, high molecular weight polymer mixture was analyzed without conducting grinding processing or the like. As a result, its volume average diameter was found to be 134 μm. By an elemental analysis, the solid, high molecular weight polymer mixture was confirmed to contain 38.8 wt. % of the acidic catalyst in terms of orthophosphoric acid.

From a portion (4.4 g) of the thus-collected, solid, high molecular weight polymer mixture, the acidic catalyst was removed in accordance with the above-described method, and polysuccinimide (2.6 g) contained in the mixture was collected. The molecular weight of the polysuccinimide was then analyzed. Its weight average molecular weight was 154,000, and its number average molecular weight was 92,000. The yield of the polysuccinimide was 96% based on the theoretical value polysuccinimide calculated from aspartic acid as the raw material.

EXAMPLE 5

Example (II) of Solid-state Polymerization Step (Step 3)

Firstly, a portion (6.0 g) of the solid, low molecular weight polymer mixture obtained in Example 3 (step 2) was charged, as was without grinding processing or the like, in a small dryer equipped with a mechanism that a cylindrical vessel was rotatable.

Under a flow of nitrogen at a low rate, vacuum solid-state polymerization was conducted at 200° C. and 1 mmHg (0.00013 MPa) for 8 hours while rotating the cylindrical vessel (at a rate of 10 revolutions per minute). During the solid-state polymerization, the reaction product retained its solid form without undergoing fusion aggregation or the like. After allowed to cool down to room temperature, a powdery, solid, high molecular weight polymer mixture (5.9 g) was collected in a form not different in external appearance from the solid, low molecular polymer mixture at the time of the charging.

Using a portion of the solid, high molecular weight polymer mixture, the volume average diameter of the solid, high molecular weight polymer mixture was analyzed without conducting grinding processing or the like. As a result, its volume average diameter was found to be 167 μm. By an elemental analysis, the solid, high molecular weight polymer mixture was confirmed to contain 38.5 wt. % of the acidic catalyst in terms of orthophosphoric acid.

From a portion (4.5 g) of the thus-collected, solid, high molecular weight polymer mixture, the acidic catalyst was removed in accordance with the above-described method, and polysuccinimide (2.7 g) contained in the mixture was collected. The weight average molecular weight of the polysuccinimide was then analyzed. Its weight average molecular weight was 162,000.

The yield of the polysuccinimide was 96% based on the theoretical value of polysuccinimide calculated from aspartic acid as the raw material.

EXAMPLE 6

Example (III) of Solid-state Polymerization Step (Step 3)

Firstly, 4.0 g of the solid, low molecular weight polymer mixture obtained in Example 3 (step 2) were charged in a tubular reactor made of SUS316 (inner diameter: 1 cm), and the tubular reactor with the polymer mixture charged therein was placed in a temperature-controllable air chamber. With a flow passage opened under atmospheric pressure on an outlet side of the tubular reactor, nitrogen was caused to flow at a flow rate of 0.5 (NL/min) through the tubular reactor. The temperature of the temperature-controllable chamber was raised, and at 220° C., fixed-bed solid-state polymerization was conducted for 4 hours under atmospheric pressure.

After allowed to cool down to room temperature, a powdery, solid, high molecular weight polymer mixture was collected in a form not different in external appearance from the solid, low molecular polymer mixture at the time of the charging.

Using a portion of the solid, high molecular weight polymer mixture, the volume average diameter of the solid, high molecular weight polymer mixture was analyzed without conducting grinding processing or the like. As a result, its volume average diameter was found to be 177 µm. From a portion of the thus-collected, solid, high molecular weight polymer mixture, the acidic catalyst was removed in accordance with the above-described method, and polysuccinimide contained in the mixture was collected. The weight average molecular weight of the polysuccinimide was then analyzed. Its weight average molecular weight was 100,000.

EXAMPLE 7

Example (IV) of Solid-state Polymerization Step (Step 3)

Firstly, a portion of the solid, low molecular weight polymer mixture obtained in Example 3 (step 2) was dry-ground to obtain the solid, low molecular weight polymer mixture in a fine particulate form having a volume average diameter of 62 µm. The solid, low molecular weight polymer mixture was charged in a tubular reactor made of SUS316 (inner diameter: 1 cm), and the tubular reactor with the polymer mixture charged therein was placed in a temperature-controllable air chamber. With a flow passage opened under atmospheric pressure on an outlet side of the tubular reactor, nitrogen was caused to flow at a flow rate of 0.5 (NL/min) through the tubular reactor. The temperature of the temperature-controllable chamber was raised, and at 220° C., fixed-bed solid-state polymerization was conducted for 4 hours under atmospheric pressure. After allowed to cool down to room temperature, a powdery, solid, high molecular weight polymer mixture was collected in a form not different in external appearance from the solid, low molecular polymer mixture at the time of the charging.

Using a portion of the solid, high molecular weight polymer mixture, the volume average diameter of the solid, high molecular weight polymer mixture was analyzed without conducting grinding processing or the like. As a result, its volume average diameter was found to be 94 µm. From a portion of the thus-collected, solid, high molecular weight polymer mixture, the acidic catalyst was removed in accordance with the above-described method, and polysuccinimide contained in the mixture was collected. The weight average molecular weight of the polysuccinimide was then analyzed. Its weight average molecular weight was 122,000.

COMPARATIVE EXAMPLE 1

Production Example (I) of Polysuccinimide

In a 500-mL flask, 50 wt. % phosphoric acid (22.1 g, 1.11 mol in terms of phosphoric acid) and L-aspartic acid (50.0 g, 0.38 mol) were successively charged. The contents were stirred and mixed at 90° C. for 20 minute under atmospheric pressure in a nitrogen atmosphere (the concentration of phosphoric acid in the binary system of phosphoric acid and aspartic acid: 18.1 wt. %, phosphoric acid/aspartic acid molar ratio: 0.3).

While controlling the pressure within a range of from 500 to 5 mmHg (0.0667 to 0.000667 MPa), the reaction mixture was next heated to 200° C. in 30 minutes. After heated to 200° C., the reaction mixture was heated under 5 mmHg (0.000667 MPa) During that heating, the reaction mixture locally presented a high degree of viscosity, underwent localized foaming, and was in a non-homogeneous state. After heated for 4 hours, a solid reaction product deposited on a stirring blade and the flask so that it was no longer possible to continue sufficient stirring. Accordingly, the heating was stopped and the reaction was terminated.

After allowed to cool down to room temperature, the reaction product was coarsely crushed and then taken out of the flask. Purification was then conducted to determine the weight average molecular weight of polysuccinimide in accordance with the above-described method. An attempt was made to dissolve the polymer in DMF of molecular weight measuring grade, but insoluble matter existed as much as 6 wt. %. The weight average molecular weight of the dissolved portion was 22,000.

COMPARATIVE EXAMPLE 2

Production Example (II) of Polysuccinimide

L-aspartic acid (50.0, 0.38 mol) was charged in a 500-mL flask, and was heated to 200° C. in 30 minutes under atmospheric pressure in a nitrogen atmosphere. After heated to 200° C., the reaction product was heated for 4 hours at 5 mmHg (0.000667 MPa). During the heating, the reaction product remained unchanged in its powder form.

After allowed to cool down to room temperature, the reaction product was taken out of the flask, and an attempt was made to dissolve the polymer in DMF of molecular weight measuring grade, but insoluble matter existed as much as 10 wt. %. The weight average molecular weight of the dissolved portion was 9,000.

COMPARATIVE EXAMPLE 3

Production Example of Solid, High Molecular Weight Polymer Mixture

Procedures of Example 1 (step 1) were repeated likewise except that the heating time at 180° C. was changed to 5 minutes, and a liquid, low molecular weight polymer mixture which contained polysuccinimide having a weight average molecular weight of 7,000 was obtained. Further, the procedures of Example 2 (step 2) were repeated likewise, and a solid, low molecular weight polymer mixture which contained polysuccinimide having a weight average molecular weight of 7,000 was obtained (concentration of phosphoric acid: 40.2 wt. %).

Using that solid, low molecular weight polymer mixture, solid-state polymerization was attempted in a similar manner as in Example 4 (step 3). In the course of heating to 220°

C., however, the solid, low molecular weight polymer mixture was molten into a liquid form, thereby making it impossible to continue the solid-state polymerization any further.

COMPARATIVE EXAMPLE 4

Production Example (I) of Solid, Low Molecular Weight Polymer Mixture

Procedures of Example 1 (step 1) were repeated likewise except that the heating temperature was changed to 175° C., and a liquid, low molecular weight polymer mixture (183.7 g) which contained polysuccinimide having a weight average molecular weight of 29,000 was obtained.

A portion of the liquid, low molecular weight polymer mixture was taken out, and was introduced under stirring over 5 minutes in an extraction solvent (methanol) (80 g) which had been heated to 30° C. The liquid, low molecular weight polymer mixture so introduced was as much as 60.6 g.

After the introduction of the liquid, low molecular weight polymer mixture, stirring was continued at 30° C. for 30 minutes, and a slurry was obtained with white particles contained therein. After the slurry was allowed to cool down to room temperature, filtration was conducted to collect a powdery, solid, low molecular weight polymer mixture. Further, vacuum drying was conducted at 50° C., and the solid, low molecular weight polymer mixture was obtained in a dried powder form (29.9 g).

By an elemental analysis, the solid, low molecular weight polymer mixture was confirmed to contain 60.1 wt. % of the acidic catalyst in terms of orthophosphoric acid. This acid catalyst concentration is equivalent to a phosphoric acid/polysuccinimide molar ratio of 1.49.

A portion of the solid, low molecular weight polymer mixture was taken out, and the weight average molecular weight of polysuccinimide contained in the mixture was determined in accordance with the above-described method. Its weight average molecular weight was 29,000.

Using that solid, low molecular weight polymer mixture, solid-state polymerization was attempted in a similar manner as in Example 4 (step 3). In the course of heating to 220° C., however, the solid, low molecular weight-polymer mixture was molten into a liquid form, thereby making it impossible to continue the solid-state polymerization any further.

COMPARATIVE EXAMPLE 5

Production Example (II) of Solid, Low Molecular Weight Polymer Mixture

A portion of the liquid, low molecular weight polymer mixture obtained in Comparative Example 4 was taken out, and was introduced under stirring over 5 minutes in an extraction solvent (methanol) (360 g) which had been heated to 30° C. The liquid, low molecular weight polymer mixture so introduced was as much as 44.0 g.

After the introduction of the liquid, low molecular weight polymer mixture, stirring was continued at 30° C. for 30 minutes, and a slurry was obtained with white particles contained therein. After the slurry was allowed to cool down to room temperature, filtration was conducted, followed by rinsing with a large excess of methanol. A powdery, solid, low molecular weight polymer mixture was collected. Further, vacuum drying was conducted at 50° C., and the solid, low molecular weight polymer mixture was obtained in a dried powder form (9.0 g).

By an elemental analysis, the solid, low molecular weight polymer mixture was confirmed to contain 3.9 wt. % of the acidic catalyst in terms of orthophosphoric acid. This acid catalyst concentration is equivalent to a phosphoric acid/polysuccinimide molar ratio of 0.04.

A portion of the solid, low molecular weight polymer mixture was taken out, and the weight average molecular weight of polysuccinimide contained in the mixture was determined in accordance with the above-described method. Its weight average molecular weight was 30,000.

Using that solid, low molecular weight polymer mixture, solid-state polymerization was conducted in a similar manner as in Example 4 (step 3). The weight average molecular weight of polysuccinimide so obtained was 32,000.

EXAMPLE 8

Example (V) of Solid-state Polymerization Step (Step 3)

Firstly, a portion (10.0 g) of the solid, low molecular weight polymer mixture obtained in Example 2 (step 2) was charged, as was without grinding processing or the like, in a small dryer equipped with a mechanism that a cylindrical vessel was rotatable. Subsequently, similar procedures as in Example 4 (step 3) were repeated, and a powdery, solid, high molecular weight polymer mixture (9.9 g) was recovered.

The solid, high molecular weight polymer mixture was packed in an extractor made of SUS316. By continuously feeding methanol with a high-pressure pump, separation of phosphoric acid was conducted at 150° C. and 2 MPa.

A solid polymer was then recovered, and vacuum drying was conducted. As a result, polysuccinimide (6.0 g) having a weight average molecular weight of 146,000 was obtained.

On the other hand, a methanol solution (142.6 g), which contained phosphoric acid separated from the solid, high molecular weight polymer mixture, was obtained. The concentration of phosphoric acid in the methanol solution was 2.7 wt. %.

EXAMPLE 9

Example (III) of Production Step (Step 2) of Solid, Low Molecular Weight Polymer Mixture A portion of the liquid, low molecular weight polymer mixture obtained in Example 1 (step 1) was taken out, and was introduced at 30° C. under stirring over 5 minutes in the methanol solution (115.5 g) obtained in Example 8 (concentration of phosphoric acid: 2.7 wt. %). The liquid, low molecular weight polymer mixture so introduced was as much as 28.9 g.

After the introduction of the liquid, low molecular weight polymer mixture, stirring was continued at 30° C. for 30 minutes, and a slurry was obtained with white particles contained therein. After the slurry was allowed to cool down to room temperature, filtration was conducted, and a powdery, solid, low molecular weight polymer mixture was collected. Further, vacuum drying was conducted at 50° C., and the solid, low molecular weight polymer mixture was obtained in a dried powder form (9.2 g).

The volume average diameter of the solid, low molecular weight polymer mixture was analyzed without conducting grinding processing or the like. As a result, its volume average diameter was found to be 171 μm.

By an elemental analysis, the solid, low molecular weight polymer mixture was confirmed to contain 38.3 wt. % of the acidic catalyst in terms of orthophosphoric acid. This acid catalyst concentration is equivalent to a phosphoric acid/polysuccinimide molar ratio of 0.61. A portion of the solid, low molecular weight polymer mixture was taken out, and the weight average molecular weight of polysuccinimide contained in the mixture was determined in accordance with the above-described method. Its weight average molecular weight was 44,000.

EXAMPLE 10

Example (IV) of Solid-state Polymerization Step (Step 3)

A portion (6.0 g) of the solid, low molecular weight polymer mixture obtained in Example 9 (step 2) was charged, as was without grinding processing or the like, in a small dryer equipped with a mechanism that a cylindrical vessel was rotatable.

Under a flow of nitrogen at a low rate, vacuum solid-state polymerization was conducted at 230° C. and 1 mmHg (0.00013 MPa) for 3.5 hours while rotating the cylindrical vessel (at a rate of 10 revolutions per minute). During the solid-state polymerization, the reaction product retained its solid form without undergoing fusion aggregation or the like.

After allowed to cool down to room temperature, a powdery, solid, high molecular weight polymer mixture (5.9 g) was collected in a form not different in external appearance from the solid, low molecular polymer mixture at the time of the charging.

Using a portion of the solid, high molecular weight polymer mixture, the volume average diameter of the solid, high molecular weight polymer mixture was analyzed without conducting grinding processing or the like. As a result, its volume average diameter was found to be 180 μm.

By an elemental analysis, the solid, high molecular weight polymer mixture was confirmed to contain 39 wt. % of the acidic catalyst in terms of orthophosphoric acid.

From a portion (4.7 g) of the thus-collected, solid, high molecular weight polymer mixture, the acidic catalyst was removed in accordance with the above-described method, and polysuccinimide (2.8 g) contained in the mixture was collected. The weight average molecular weight of the polysuccinimide was 151,000.

The yield of the polysuccinimide was 96% based on the theoretical value of polysuccinimide calculated from aspartic acid as the raw material.

EXAMPLE 11

Production Example of Superabsorbent Polymer from Polysuccinimide

In a flask equipped with a stirrer, DMF (8.0 g) and a portion (2.0 g, 0.021 mol) of the polysuccinimide (weight average molecular weight: 154,000) obtained in Example 4 (step 3) was charged, and a homogeneous polymer solution was obtained.

Under a nitrogen gas stream, a solution (1.5 g) of a cross-linking agent [a solution obtained by adding sodium hydroxide (0.15 g, 0.0037 mol) to a liquid mixture of L-lysine hydrochloride (0.56 g, 0.0031 mol) and distilled water (0.8 g) such that hydrochloric acid was neutralized] was introduced at 25° C. over 30 seconds. Five minutes after the addition of the solution of the cross-linking agent, the reaction mass turned to a gel form typical to a cross-linked product, and the stirring was stopped. The cross-linked product was allowed to stand at 25° C. for 20 hours. A liquid mixture consisting of distilled water (80 g) and methanol (80 g) was then charged into a mixer, and the cross-lined product was chopped under stirring. An aqueous solution of sodium hydroxide (concentration of sodium hydroxide: 25 wt. %) was then added at 25 to 30° C. such that the resulting mixture remained at pH 11.5 to 12 to hydrolyze the cross-linked product. As a result, a viscous gel-like mixture was obtained. After the hydrolysis, the gel-like mixture was neutralized to pH 7 with a 7% solution of hydrochloric acid, and then introduced into a large excess of methanol to solidify the same. The thus-solidified product was collected by filtration, and then dried to obtain crosslinked polyaspartic acid (3.0 g, yield: 97%). The distilled water absorption of the thus-obtained polymer was 620 (g/g-polymer) (40 minutes later), and its physiological saline absorption was 50 (g/g-polymer) (40 minutes later)

COMPARATIVE EXAMPLE 6

Production Example of Superabsorbent Polymer from Polysuccinimide

In a flask equipped with a stirrer, DMF (8.0 g) and a portion (2.0 g, 0.021 mol) of the polysuccinimide (weight average molecular weight: 32,000) obtained in Comparative Example 5 was charged, and a homogeneous polymer solution was obtained.

Under a nitrogen gas stream, a solution (1.5 g) of a cross-linking agent [a solution obtained by adding sodium hydroxide (0.15 g, 0.0037 mol) to a liquid mixture of L-lysine hydrochloride (0.56 g, 0.0031 mol) and distilled water (0.8 g) such that hydrochloric acid was neutralized] was introduced at 25° C. over 30 seconds. Even upon an elapsed time of 20 hours since the addition of the solution of the cross-linking agent, the reaction mass did not turned to a gel form typical to a cross-linked product. Hydrolysis was then conducted in a similar manner as in Example 11. However, no superabsorbent polymer was obtained, and instead, a water-soluble polymer was formed.

EXAMPLE 12

Production Example of High Molecular Weight Polysuccinimide

The procedures of Example 1 (step 1) were repeated likewise except that the reaction conditions upon production of a liquid, low molecular weight polymer mixture were changed to 150° C. and 10 mmHg (0.0013 MPa) and the heating was conducted for 10 hours. Subsequent to the completion of the heating, a liquid, low molecular weight polymer mixture (the weight average molecular weight of polysuccinimide contained in the polymer mixture: 38,000) was obtained as a slightly viscous, extremely slightly yellowish, clear, homogeneous solution.

The liquid, low molecular weight polymer mixture was subjected to similar procedures as in Example 2 (step 2), and a white, solid, low molecular weight polymer mixture (the weight average molecular weight of polysuccinimide contained in the polymer mixture: 38,000) was obtained with 38.2 wt. % of the acidic catalyst contained therein in terms of orthophosphoric acid. The solid, low molecular weight polymer mixture was then subjected to similar procedures as in Example 4 (step 3) to conduct production of a solid, high molecular weight polymer mixture by solid-state polymerization.

The weight average molecular weight of the resultant pale yellow polysuccinimide was 160,000. The yield of the polysuccinimide was 98% based on the theoretical value of polysuccinimide calculated from aspartic acid as the raw material.

Comparative Discussion on Examples 1–12 and Comparative Examples 1–6

In Comparative Example 1, the reaction was conducted on the reactant which contained 18 wt. % of the acidic catalyst. The state of the reaction was non-homogeneous, and the molecular weight of the resultant polysuccinimide was low. In the course of the reaction, the reaction product locally presented high viscosity, underwent localized foaming, and was in a non-homogeneous form. Further, due to the deposition of the reaction product on the reaction vessel and the stirring blade, it was extremely difficult to continue the reaction.

In Comparative Example 2, polymerization of aspartic acid was attempted without using the acidic catalyst. The reactant was heated in its powder form without showing viscosity, but the molecular weight of the resultant polysuccinimide was low.

In Comparative Example 3, the weight average molecular weight of the polysuccinimide contained in the liquid, low molecular weight polymer mixture was low. In the solid state polymerization step which was conducted including the production step of the solid, low molecular weight polymer mixture, melting of the solid, low molecular weight polymer mixture took place, and the solid, low molecular weight polymer mixture turned to a liquid form. It was therefore impossible to continue the solid-state polymerization any further.

In Comparative Example 4, the concentration of phosphoric acid in the solid, low molecular weight polymer mixture was so high that in the solid-state polymerization step, melting of the solid, low molecular weight polymer mixture took place, and the solid, low molecular weight polymer mixture turned to a liquid form. It was therefore impossible to continue the solid-state polymerization any further.

In Comparative Example 5, the concentration of phosphoric acid in the solid, low molecular weight polymer mixture was so low that the molecular weight of the resultant polysuccinimide was low, although it was possible to conduct the solid-state polymerization without problems.

In Comparative Example 6, it was attempted to produce a superabsorbent polymer by using the polysuccinimide the weight average molecular weight of which was 32,000. As the weight average molecular weight was low, no superabsorbent polymer was obtained.

In contrast, in Example 1, production of a liquid, low molecular weight polymer mixture was conducted with the concentration of phosphoric acid controlled within the predetermined range. As a result, a liquid, low molecular weight polymer mixture was obtained as a highly homogeneous solution. In the course of the liquid, low molecular weight polymer mixture, stable production was also feasible without formation of a highly viscous phase or development of foaming.

In Example 2, a solid, low molecular weight polymer mixture—in which the concentration of phosphoric acid and the weight average molecular weight of polysuccinimide contained in the polymer mixture were controlled within the predetermined ranges, respectively—was obtained using methanol as an extraction solvent. With respect to the solid, low molecular weight polymer mixture, vacuum solid-state polymerization was conducted in Example 4. As a result, a solid, high molecular weight polymer mixture which contained polysuccinimide of high weight average molecular weight was obtained in its powder form without development of melting or fusion aggregation of the reaction product in the course of the reaction. From Examples 1, 2 and 4, it has been confirmed that polysuccinimide can be produced with high yield.

In Example 3, a solid, low molecular weight polymer mixture—in which the concentration of phosphoric acid and the weight average molecular weight of polysuccinimide contained in the polymer mixture were controlled within the predetermined ranges, respectively—was obtained using as an extraction solvent methanol which contained phosphoric acid. With respect to the solid, low molecular weight polymer mixture, vacuum solid-state polymerization was conducted in Example 5. As a result, a solid, high molecular weight polymer mixture which contained polysuccinimide of high weight average molecular weight was obtained in its powder form without development of melting or fusion aggregation of the reaction product in the course of the reaction. From Examples 1, 3 and 5, it has been confirmed that polysuccinimide can be produced with high yield.

In Examples 6 and 7, atmospheric solid-state polymerization was conducted. A solid, high molecular weight polymer mixture which contained polysuccinimide of high weight average molecular weight was obtained in its powder form without development of melting or fusion aggregation of the reaction product in the course of the reaction. In Example 7 in which the particle size was rendered smaller, polysuccinimide having a still higher weight average molecular weight than in Example 6 was obtained.

In Examples 8-10, investigations were made on the production step of a solid, low molecular weight polymer mixture and the solid-state polymerization step by reusing, as an extraction solvent for the production step of the solid, low molecular weight polymer mixture, a phosphoric-acid-containing methanol solution which occurred upon separation of polysuccinimide of high weight average molecular weight from a solid, high-molecular polymer mixture. As a result, polysuccinimide samples of high weight average molecular weight were obtained with high yield. In Example 11, the synthesis of a superabsorbent polymer was conducted using polysuccinimide of high weight average molecular weight produced by the process of the present invention. As a result, it was possible to obtain, with high yield, a superabsorbent polymer equipped with good water absorbency. In Example 12, polysuccinimide having a high weight average molecular weight was obtained with high yield.

As has been described above, the present invention has made it possible to produce polysuccinimide, which has a high weight average molecular weight, by using simpler equipment, for example, by atmospheric solid-state polymerization. In addition, the present invention can solvent the problems occurred in the course of polymerization by the conventional techniques, such as the formation of an extremely viscous phase, the excessive formation of foam and the formation of coherent mass of the reaction product, by the appropriate setting of the concentration of an acidic catalyst and the weight average molecular weight in the respective steps, thereby making it possible to produce polysuccinimide of high weight average molecular weight in a manner suited for continuous mass-production.

What is claimed is:

1. A production process of high molecular weight polysuccinimide, which comprises the following steps 1) to 3):

1) polycondensing a mixture, which comprises aspartic acid and an acidic catalyst, a weight concentration C1 of said acidic catalyst based on a total weight of a weight of said aspartic acid and a weight WA1 of said acidic catalyst being indicated by the below-described numerical formula (1), at 80 to 350° to produce a liquid, low molecular weight polymer mixture comprising low molecular weight polysuccinimide, which has a weight average molecular weight Mw1 indicated by the below-described numerical formula (2), and said acidic catalyst:

$$20 \text{ [wt. \%]} \leq C1 \leq 99 \text{ [wt. \%]} \quad (1)$$

$$1.0 \times 10^4 \leq Mw1 \leq 2.0 \times 10^5 \quad (2)$$

2) from said liquid, low molecular weight polymer mixture produced in step 1, producing a solid, low molecular weight polymer mixture wherein the low molecular weight polymer has a weight average molecular weight Mw2 indicated by the below-described numerical formula (5), and a weight concentration C2 of said acidic catalyst based on a total weight of a weight of low molecular weight polysuccinimide and a weight WA2 of said acidic catalyst is indicated by the below-described numerical formula (3) wherein C2 is less than C1 and said weight WA2 of said acidic catalyst is indicated by the below-described numerical formula (4), and said solid, low molecular weight polymer mixture being free from melting under reaction conditions of the following step 3):

$$5 \text{ [wt. \%]} \leq C2 \leq 55 \text{ [wt. \%]} \quad (3)$$

$$WA2 < WA1 \quad (4)$$

$$1.0 \times 10^4 \leq Mw2 \leq 2.0 \times 10^5 \quad (5)$$

3) subjecting said solid, low molecular weight polymer mixture produced in step 2) to solid-state polymerization at 120 to 350° to produce a solid, high molecular weight polymer mixture comprising high molecular weight polysuccinimide, which has a weight average molecular weight Mw3 capable of satisfying the below-described numerical formulas (6), (7) and (8) at the same time, and said acidic catalyst:

$$4.0 \times 10^4 \leq Mw3 \leq 1.0 \times 10^6 \quad (6)$$

$$Mw1 < Mw3 \quad (7)$$

$$Mw2 < Mw3 \quad (8).$$

2. A production process according to claim 1, wherein said step 2), in which said solid, low molecular weight polymer mixture is produced, comprises the following steps 2-1) and 2-2):

2-1) adding an extraction solvent, which has such function as not substantially dissolving said low molecular weight polysuccinimide but dissolving said acidic catalyst at least in part, to said liquid, low molecular weight polymer mixture produced in step 1 to have at least a part of said acidic catalyst moved from said liquid, low molecular weight polymer mixture into a phase of said extraction solvent, thereby producing a slurry which comprises a solid, low molecular weight polymer mixture, said mixture containing said acidic catalyst at a reduced content and low molecular weight polysuccinimide, and an extract containing the thus-extracted acid catalyst and said extraction solvent; and 2-2) solid/liquid-separating said slurry produced in step 2-1 into said solid, low molecular weight polymer mixture, said mixture containing said acidic catalyst at said reduced content and said low molecular weight polysuccinimide, and said extract containing the thus-extracted acid catalyst and said extraction solvent.

3. A production process according to claim 2, wherein said step 2), in which said solid, low molecular weight polymer mixture is produced, further comprises the following step 2-3):

drying said solid, low molecular weight polymer mixture, which has been separated in step 2-2, to produce a solid, low molecular weight polymer mixture substantially free of said extraction solvent.

4. A production process according to claim 1, wherein said step 3, as a solid-state polymerization step, comprises processing in which said solid, low molecular weight polymer mixture produced in step 2 is dried.

5. A production process according to claim 1, wherein said step 3, as a solid-state polymerization step, comprises processing in which said extraction solvent contained in said solid, low molecular weight polymer mixture produced in step 2 is driven off.

6. A production process according to claim 1, wherein at least a part of a course of a polycondensation reaction in step 1), in which said liquid, low molecular weight polymer mixture is produced, is conducted under a pressure P1-1 indicated by the following numerical formula (9):

$$0.1 \text{ [MPa]} \leq P1\text{-}1 \leq 10 \text{ [MPa]} \quad (9).$$

7. A production process according to claim 1, wherein at least a part of a course of a polycondensation reaction in step 1), in which said liquid, low molecular weight polymer mixture is produced, is conducted under a pressure P1-2 indicated by the following numerical formula (10):

$$0.00001 \text{ [MPa]} \leq P1\text{-}2 \leq 0.1 \text{ [MPa]} \quad (10).$$

8. A production process according to claim 1, wherein at least a part of a course of a solid-state polymerization reaction in step 3), as a solid-state polymerization step, is conducted under a pressure P2-1 indicated by the following numerical formula (11):

$$0.1 \text{ [MPa]} \leq P2\text{-}1 \leq 10 \text{ [MPa]} \quad (11).$$

9. A production process according to claim 1, wherein at least a part of a course of a solid-state polymerization reaction in step 3), as a solid-state polymerization step, is conducted under a pressure P2-2 indicated by the following numerical formula (12):

$$0.00001 \text{ [MPa]} \leq P2\text{-}2 \leq 0.1 \text{ [MPa]} \quad (12).$$

10. A production process according to claim 1, wherein said solid, high molecular weight polymer mixture produced in step 3, as a solid-state polymerization step, contains said acidic catalyst at a weight concentration C3 indicated by the following numerical formula (13) based on a total weight of a weight of said solid, high molecular weight polymer and a weight WA3 of said acidic catalyst:

$$5 \text{ [wt. \%]} \leq C3 \leq 55 \text{ [wt. \%]} \quad (13).$$

11. A production process according to claim 2, wherein said extraction solvent added in step 2-1), as a slurry production step, comprises an organic solvent and/or water.

12. A production process according to claim 11, wherein said organic solvent comprises at least one solvent selected from the group consisting of (i) alcohols having 1 to 20 carbon atoms, (ii) ketones having 3 to 20 carbon atoms, (iii) ethers having 3 to 20 carbon atoms, and (iv) acetate esters having 3 to 20 carbon atoms.

13. A production process according to claim 11, wherein said organic solvent comprises at least one organic solvent selected from the group consisting of methanol, isopropanol and acetone.

14. A production process according to claim 1, wherein said acidic solvent comprises a phosphorus oxyacid.

15. A production process according to claim 1, wherein a relationship between Mw2 and Mw3 before and after step 3, as a solid-state polymerization step, is indicated by the following numerical formula (14):

$$Mw3 - Mw2 \geq 1.0 \times 10^4 \tag{14}$$

16. A production process according to claim 1, wherein at least a part of the steps is conducted under an inert atmosphere.

17. A production process according to claim 1, wherein at least a part of the steps is conducted continuously.

* * * * *